(12) United States Patent
Ihara et al.

(10) Patent No.: US 10,833,362 B2
(45) Date of Patent: Nov. 10, 2020

(54) SECONDARY BATTERY INCLUDING ELECTROLYTE HAVING AN UNSATURATED CYCLIC ESTER CARBONATE

(71) Applicant: Sony Corporation, Tokyo (JP)

(72) Inventors: Masayuki Ihara, Fukushima (JP); Tadahiko Kubota, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 74 days.

(21) Appl. No.: 15/345,796

(22) Filed: Nov. 8, 2016

(65) Prior Publication Data

US 2017/0117577 A1    Apr. 27, 2017

Related U.S. Application Data

(63) Continuation of application No. 13/770,216, filed on Feb. 19, 2013, now Pat. No. 9,577,288.

(30) Foreign Application Priority Data

Feb. 28, 2012    (JP) ................................. 2012-041562

(51) Int. Cl.
*H01M 10/0566* (2010.01)
*H01M 10/0525* (2010.01)
(Continued)

(52) U.S. Cl.
CPC ....... *H01M 10/0566* (2013.01); *H01M 4/133* (2013.01); *H01M 4/587* (2013.01);
(Continued)

(58) Field of Classification Search
CPC ......... H01M 10/0566; H01M 10/0567; H01M 4/133; H01M 4/587; H01M 10/0525
(Continued)

(56) References Cited

U.S. PATENT DOCUMENTS

2003/0157413 A1* 8/2003 Chen ................... H01M 10/052
429/326
2007/0196732 A1    8/2007 Tatebayashi et al.
(Continued)

FOREIGN PATENT DOCUMENTS

CN    101339984    1/2009
CN    101454938    6/2009
(Continued)

OTHER PUBLICATIONS

Hibara, Akio, Machine Translation of JP 2002-329528 A, Nov. 2002 (Year: 2002).*

(Continued)

*Primary Examiner* — Sean P Cullen
(74) *Attorney, Agent, or Firm* — K&L Gates LLP

(57) ABSTRACT

A secondary battery is provided. The secondary battery includes a cathode; an anode; and an electrolytic solution, wherein the anode comprises an anode active material layer, wherein the anode active material layer comprises a carbon material, wherein the anode active material layer has a thickness from about 40 micrometers to about 100 micrometers, and wherein the electrolytic solution comprises an unsaturated cyclic ester carbonate represented by Formula (2):

(2)

(Continued)

where R5 and R6 are selected from the group consisting of a hydrogen group, an alkyl group, an alkyne group, and an aryl group.

12 Claims, 6 Drawing Sheets

(51) Int. Cl.
    *H01M 4/133* (2010.01)
    *H01M 10/0567* (2010.01)
    *H01M 4/587* (2010.01)
    *H01M 4/02* (2006.01)

(52) U.S. Cl.
    CPC ... *H01M 10/0525* (2013.01); *H01M 10/0567* (2013.01); *H01M 2004/027* (2013.01); *H01M 2300/0025* (2013.01); *Y02E 60/122* (2013.01); *Y02T 10/7011* (2013.01)

(58) Field of Classification Search
    USPC .................. 429/324, 330, 336, 337, 338
    See application file for complete search history.

(56) References Cited

U.S. PATENT DOCUMENTS

| | | | |
|---|---|---|---|
| 2009/0011333 A1 | 1/2009 | Wakita et al. | |
| 2009/0017386 A1 | 1/2009 | Xu et al. | |
| 2009/0246626 A1 | 10/2009 | Tasaki et al. | |
| 2009/0253045 A1* | 10/2009 | Kotato | H01M 10/0525 429/326 |
| 2010/0035147 A1 | 2/2010 | Kotato et al. | |
| 2010/0209785 A1* | 8/2010 | Kawashima | H01M 10/0569 429/338 |
| 2010/0316908 A1 | 12/2010 | Yoshimura et al. | |
| 2011/0200885 A1 | 8/2011 | Yamada et al. | |
| 2011/0274987 A1* | 11/2011 | Ihara | H01M 10/052 429/337 |
| 2013/0230768 A1 | 9/2013 | Sakamoto et al. | |
| 2014/0093786 A1* | 4/2014 | Ito | H01M 4/62 429/322 |

FOREIGN PATENT DOCUMENTS

| | | |
|---|---|---|
| CN | 102163745 | 8/2011 |
| CN | 102959772 | 3/2013 |
| JP | 07-282849 | 10/1995 |
| JP | 11-191319 | 7/1999 |
| JP | 2000-058122 | 2/2000 |
| JP | 2000-182669 | 6/2000 |
| JP | 2001-085056 | 3/2001 |
| JP | 2001-135351 | 5/2001 |
| JP | 2002-008718 | 1/2002 |
| JP | 2002329528 A * | 11/2002 |
| JP | 2003-017121 | 1/2003 |
| JP | 2004-022336 | 1/2004 |
| JP | 2004-127943 | 4/2004 |
| JP | 2004-172117 | 6/2004 |
| JP | 2004-172120 | 6/2004 |
| JP | 2004-523073 | 7/2004 |
| JP | 2004-253296 | 9/2004 |
| JP | 2005-135701 | 5/2005 |
| JP | 2005-228631 | 8/2005 |
| JP | 2006-114388 | 4/2006 |
| JP | 2006-344391 | 12/2006 |
| JP | 2006-351337 | 12/2006 |
| JP | 2007-005242 | 1/2007 |
| JP | 2008-010414 | 1/2008 |
| JP | 2010-533359 | 10/2010 |
| WO | 2012/002396 | 1/2012 |

OTHER PUBLICATIONS

Chalasani et al., Surface analysis and cycling performance of lithium ion cells containing methylene ethylene carbonate (MEC), 2011, Meeting Abstracts, The Electrochemical Society, 17, 1427 (Year: 2011).*

Chalasani et al., Methylene ethylene carbonate: Novel additive to improve the high temperature performance of lithium ion batteries, Feb. 10, 2012, Journal of Power Sources, 208, 67-73 (Year: 2012).*

Chinese Office Action dated Aug. 5, 2019 in corresponding Chinese Application No. 201610895303.3.

Chinese Office Action dated Mar. 19, 2020 in corresponding Chinese Application No. 201610895303.3.

Chinese Office Action dated Sep. 8,2020 in corresponding Chinese Application No. 2016108953013.3.

* cited by examiner

SECONDARY BATTERY INCLUDING ELECTROLYTE HAVING AN UNSATURATED CYCLIC ESTER CARBONATE

CROSS-REFERENCE TO RELATED APPLICATIONS

The present application is a continuation of U.S. application Ser. No. 13/770,216, filed Feb. 19, 2013, which claims priority to Japanese Application No. 2012-041562, filed Feb. 28, 2012, the disclosures of which are incorporated herein by reference.

BACKGROUND

The present application relates to a secondary battery including a cathode, an anode, and an electrolytic solution, and to a battery pack, an electric vehicle, an electric power storage system, an electric power tool, and an electronic apparatus that use the secondary battery.

In recent years, various electronic apparatuses such as a mobile phone and a personal digital assistant (PDA) have been widely used, and it has been demanded to further reduce the size and the weight of the electronic apparatuses and to achieve their long life. Accordingly, as an electric power source for the electronic apparatuses, a battery, in particular, a small and light-weight secondary battery capable of providing high energy density has been developed. In these days, it has been considered to apply such a secondary battery to various other applications in addition to the foregoing electronic apparatuses. Representative examples of such other applications include a battery pack attachably and detachably mounted on the electronic apparatuses or the like, an electric vehicle such as an electric automobile, an electric power storage system such as a home electric power server, and an electric power tool such as an electric drill.

As the secondary battery, secondary batteries that obtain a battery capacity by utilizing various charge and discharge principles have been proposed. In particular, a secondary battery utilizing insertion and extraction of an electrode reactant is considered promising, since such a secondary battery provides higher energy density than lead batteries, nickel-cadmium batteries, and the like.

The secondary battery includes a cathode, an anode, and an electrolytic solution. The electrolytic solution contains a solvent and an electrolyte salt. The electrolytic solution functioning as a medium for a charge and discharge reaction largely affects performance of the secondary battery. Therefore, various studies have been made on the composition of the electrolytic solution. Specifically, to suppress battery degradation at the time of high-voltage charging, explosion hazard due to pressure increase inside a battery, and/or the like, a cyclic ester carbonate having one or more carbon-carbon unsaturated bonds is used as an additive of an electrolytic solution (for example, see Japanese Unexamined Patent Application Publication Nos. 2006-114388, 2001-135351, H11-191319, 2000-058122, and 2008-010414, and Japanese Unexamined Patent Application Publication (Translation of PCT Application) No. 2004-523073). This kind of cyclic ester carbonate is used not only for a battery (liquid battery) using an electrolytic solution, but also for a battery not using an electrolytic solution (solid state battery) (for example, see Japanese Unexamined Patent Application Publication No. 2003-017121).

SUMMARY

In recent years, high performance and multi-functions of the electronic apparatuses and the like to which the secondary battery is applied are increasingly developed. Therefore, further improvement of the battery characteristics has been desired.

It is desirable to provide a secondary battery capable of providing superior battery characteristics, a battery pack, an electric vehicle, an electric power storage system, an electric power tool, and an electronic apparatus.

According to an embodiment of the present application, there is provided a secondary battery including: a cathode; an anode; and an electrolytic solution. The anode includes an anode active material layer on an anode current collector. The anode active material layer includes a carbon material. The anode active material layer has a thickness from about 30 micrometers to about 100 micrometers both inclusive. The electrolytic solution includes an unsaturated cyclic ester carbonate represented by the following Formula (1).

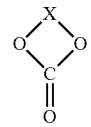

(1)

(X is a divalent group in which m-number of >C=CR1R2 and n-number of >CR3R4 are bonded in any order. Each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of the R1 to the R4 are allowed to be bonded to one another. m and n satisfy m≥1 and n≥0.)

According to an embodiment of the present application, there is provided a battery pack including: a secondary battery; a control section controlling a used state of the secondary battery; and a switch section switching the used state of the secondary battery according to an instruction of the control section. The secondary battery includes a cathode, an anode, and an electrolytic solution. The anode includes an anode active material layer on an anode current collector. The anode active material layer includes a carbon material. The anode active material layer has a thickness from about 30 micrometers to about 100 micrometers both inclusive. The electrolytic solution includes an unsaturated cyclic ester carbonate represented by the following Formula (1).

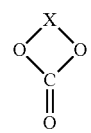

(1)

(X is a divalent group in which m-number of >C=CR1R2 and n-number of >CR3R4 are bonded in any order. Each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of the R1 to the R4 are allowed to be bonded to one another. m and n satisfy m≥1 and n≥0.)

According to an embodiment of the present application, there is provided an electric vehicle including: a secondary battery; a conversion section converting electric power supplied from the secondary battery into drive power; a drive section operating according to the drive power; and a control section controlling a used state of the secondary battery. The secondary battery includes a cathode, an anode, and an electrolytic solution. The anode includes an anode active material layer on an anode current collector. The anode active material layer includes a carbon material. The anode active material layer has a thickness from about 30 micrometers to about 100 micrometers both inclusive. The electrolytic solution includes an unsaturated cyclic ester carbonate represented by the following Formula (1).

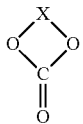

(1)

(X is a divalent group in which m-number of >C═CR1R2 and n-number of >CR3R4 are bonded in any order. Each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of the R1 to the R4 are allowed to be bonded to one another. m and n satisfy m≥1 and n≥0.)

According to an embodiment of the present application, there is provided an electric power storage system including: a secondary battery; one or more electric devices supplied with electric power from the secondary battery; and a control section controlling the supplying of the electric power from the secondary battery to the one or more electric devices. The secondary battery includes a cathode, an anode, and an electrolytic solution. The anode includes an anode active material layer on an anode current collector. The anode active material layer includes a carbon material. The anode active material layer has a thickness from about 30 micrometers to about 100 micrometers both inclusive. The electrolytic solution includes an unsaturated cyclic ester carbonate represented by the following Formula (1).

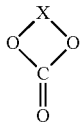

(1)

(X is a divalent group in which m-number of >C═CR1R2 and n-number of >CR3R4 are bonded in any order. Each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of the R1 to the R4 are allowed to be bonded to one another. m and n satisfy m≥1 and n≥0.)

According to an embodiment of the present application, there is provided an electric power tool including: a secondary battery; and a movable section being supplied with electric power from the secondary battery. The secondary battery includes a cathode, an anode, and an electrolytic solution. The anode includes an anode active material layer on an anode current collector. The anode active material layer includes a carbon material. The anode active material layer has a thickness from about 30 micrometers to about 100 micrometers both inclusive. The electrolytic solution includes an unsaturated cyclic ester carbonate represented by the following Formula (1).

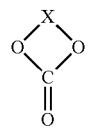

(1)

(X is a divalent group in which m-number of >C═CR1R2 and n-number of >CR3R4 are bonded in any order. Each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of the R1 to the R4 are allowed to be bonded to one another. m and n satisfy m≥1 and n≥0.)

According to an embodiment of the present application, there is provided an electronic apparatus comprising a secondary battery as an electric power supply source. The secondary battery includes a cathode, an anode, and an electrolytic solution. The anode includes an anode active material layer on an anode current collector. The anode active material layer includes a carbon material. The anode active material layer has a thickness from about 30 micrometers to about 100 micrometers both inclusive. The electrolytic solution includes an unsaturated cyclic ester carbonate represented by the following Formula (1).

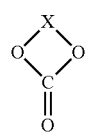

(1)

(X is a divalent group in which m-number of >C═CR1R2 and n-number of >CR3R4 are bonded in any order. Each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of the R1 to the R4 are allowed to be bonded to one another. m and n satisfy m≥1 and n≥0.)

The foregoing thickness of the anode active material layer refers to a thickness of one anode active material layer, that is, a thickness of the anode active material layer on one side of the anode current collector. Therefore, in the case where the anode active material layer is provided only on one side of the anode current collector, the foregoing thickness of the anode active material layer refers to the thickness of that anode active material layer on one side of the anode current collector. On the other hand, in the case where the anode active material layers are provided on both sides of the anode current collector, the foregoing thickness of the anode active material layer refers to a thickness of each anode active material layer.

According to the secondary battery according to the embodiment of the present application, since the anode active material layer contains a carbon material, the thickness of the anode active material layer is from about 30 μm to about 100 μm both inclusive, and the electrolytic solution contains the unsaturated cyclic ester carbonate, superior battery characteristics are obtainable. Further, according to the battery pack, the electric vehicle, the electric power storage system, the electric power tool, and the electronic apparatus according to the embodiments of the present application, similar effects are obtainable.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

DETAILED DESCRIPTION

An embodiment of the present application will be hereinafter described in detail with reference to the drawings. The description will be given in the following order.
1. Secondary Battery
 1-1. Cylindrical Type
 1-2. Laminated Film Type
2. Applications of Secondary Battery
 2-1. Battery Pack
 2-2. Electric Vehicle
 2-3. Electric Power Storage System
 2-4. Electric Power Tool
[1. Secondary Battery]
[1-1. Cylindrical Type]

Figure 1:
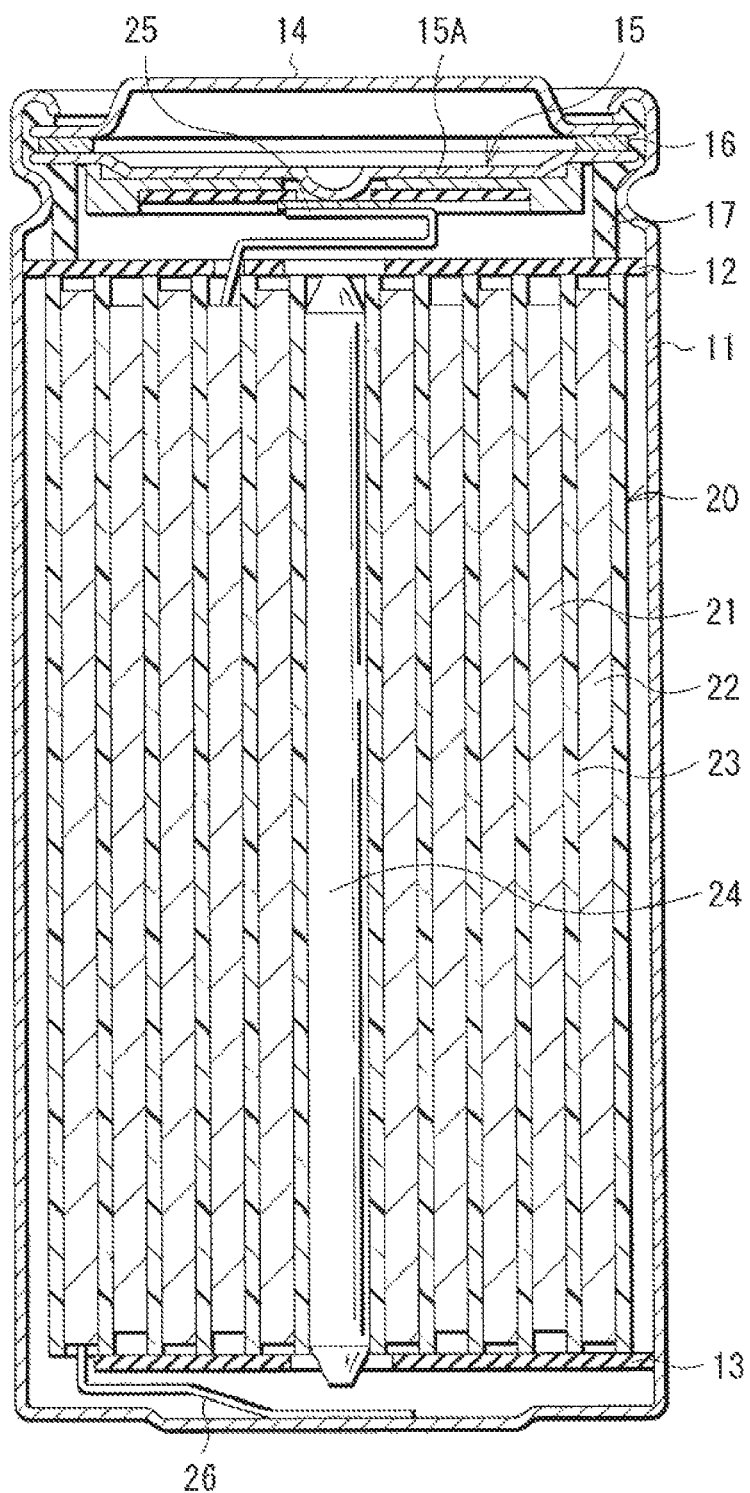
FIG. 1 is a cross-sectional view illustrating a configuration of a secondary battery (cylindrical type) according to an embodiment of the present application.
Figure 2:
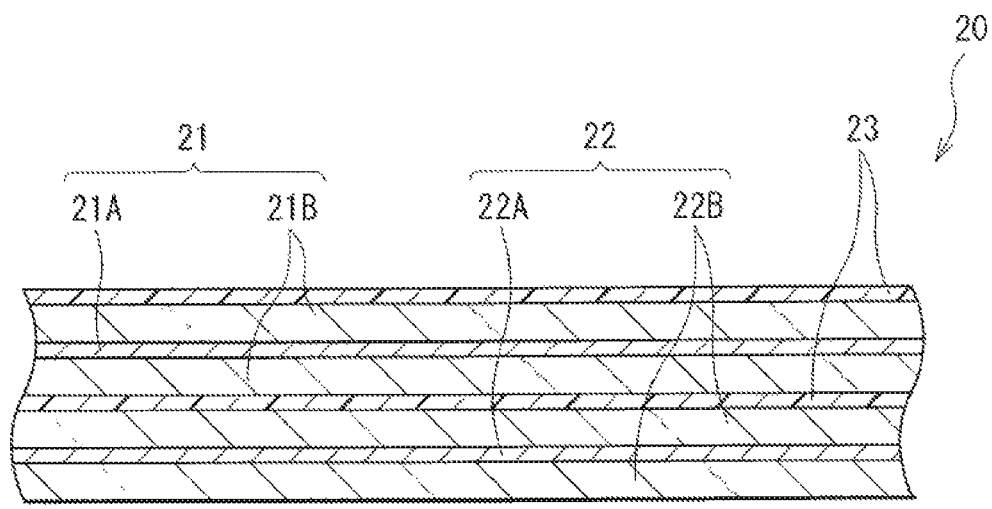
FIG. 2 is a cross-sectional view illustrating an enlarged part of a spirally wound electrode body illustrated in FIG. 1.

FIG. 1 and FIG. 2 illustrate cross-sectional configurations of a secondary battery according to an embodiment of the present application. FIG. 2 illustrates enlarged part of a spirally wound electrode body 20 illustrated in FIG. 1.

[Whole Configuration of Secondary Battery]

The secondary battery herein described is a lithium ion secondary battery in which the capacity of an anode 22 is obtained by insertion and extraction of Li (lithium ions) as an electrode reactant.

The secondary battery is what we call a cylindrical-type secondary battery. The secondary battery contains the spirally wound electrode body 20 and a pair of insulating plates 12 and 13 inside a battery can 11 in the shape of a substantially hollow cylinder. In the spirally wound electrode body 20, for example, a cathode 21 and the anode 22 are layered with a separator 23 in between and are spirally wound.

The battery can 11 has a hollow structure in which one end of the battery can 11 is closed and the other end of the battery can 11 is opened. The battery can 11 may be made of, for example, iron, aluminum, an alloy thereof, or the like. It is to be noted that the surface of the battery can 11 may be plated with nickel or the like. The pair of insulating plates 12 and 13 is arranged to sandwich the spirally wound electrode body 20 in between, and to extend perpendicularly to the spirally wound periphery surface.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made of, for example, an insulating material. The surface of the gasket 17 may be coated with asphalt.

In the center of the spirally wound electrode body 20, for example, a center pin 24 is inserted. However, the center pin 24 is not necessarily included therein. For example, a cathode lead 25 made of a conductive material such as aluminum is connected to the cathode 21. For example, an anode lead 26 made of a conductive material such as nickel is connected to the anode 22. The cathode lead 25 is attached to the safety valve mechanism 15 by welding or the like, and is electrically connected to the battery cover 14. The anode lead 26 is attached to the battery can 11 by welding or the like, and is electrically connected to the battery can 11.

[Cathode]

The cathode 21 has a cathode active material layer 21B on a single surface or both surfaces of a cathode current collector 21A. The cathode current collector 21A may be made of, for example, a conductive material such as aluminum, nickel, and stainless steel.

The cathode active material layer 21B contains, as cathode active materials, one or more of cathode materials capable of inserting and extracting lithium ions. The cathode active material layer 21B may further contain other materials such as a cathode binder and a cathode electric conductor as necessary.

The cathode material is preferably a lithium-containing compound, since high energy density is obtained thereby. Examples of the lithium-containing compound include a lithium-transition-metal composite oxide and a lithium-transition-metal-phosphate compound. The lithium-transition-metal composite oxide is an oxide containing Li and one or more transition metal elements as constituent elements. The lithium-transition-metal-phosphate compound is a phosphate compound containing Li and one or more transition metal elements as constituent elements. In particular, it is preferable that the transition metal element be one or more of Co, Ni, Mn, Fe, and the like, since a higher voltage is obtained thereby. The chemical formula thereof is expressed by, for example, $Li_xM1O_2$ or $Li_yM2PO_4$. In the formulas, M1 and M2 represent one or more transition metal elements. Values of x and y vary according to the charge and discharge state, and are generally in the range of $0.05 \leq x \leq 1.10$ and $0.05 \leq y \leq 1.10$.

Examples of the lithium-transition-metal composite oxide include $LiCoO_2$, $LiNiO_2$, and a lithium-nickel-based composite oxide represented by the following Formula (20). Examples of the lithium-transition-metal-phosphate compound include $LiFePO_4$ and $LiFe_{1-u}Mn_uPO_4$ (u<1), since thereby, a high battery capacity is obtained and superior cycle characteristics are obtained.

$$LiNi_{1-z}M_zO_2 \quad (20)$$

In Formula (20), M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z satisfies $0.005 < z < 0.5$.

In addition thereto, the cathode material may be, for example, an oxide, a disulfide, a chalcogenide, a conductive polymer, or the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene. However, the cathode material is not limited to the foregoing materials.

Examples of the cathode binder include one or more of synthetic rubbers, polymer materials, and the like. Examples of the synthetic rubber include a styrene-butadiene-based rubber, a fluorine-based rubber, and ethylene propylene diene. Examples of the polymer material include polyvinylidene fluoride and polyimide.

Examples of the cathode electric conductor include one or more of carbon materials and the like. Examples of the carbon materials include graphite, carbon black, acetylene black, and Ketjen black. The cathode electric conductor may be a metal material, a conductive polymer, or the like as long as the material has electric conductivity.

[Anode]

The anode 22 has an anode active material layer 22B on a single surface or both surfaces of an anode current collector 22A.

The anode current collector 22A may be made of, for example, a conductive material such as copper, nickel, and stainless steel. The surface of the anode current collector 22A is preferably roughened. Thereby, due to what we call an anchor effect, adhesion characteristics of the anode active material layer 22B with respect to the anode current collector 22A are improved. In this case, it is enough that the surface of the anode current collector 22A in a region opposed to the anode active material layer 22B is roughened at minimum. Examples of roughening methods include a method of forming fine particles by electrolytic treatment. The electrolytic treatment is a method of providing concavity and convexity by forming fine particles on the surface of the anode current collector 22A by an electrolytic method in an electrolytic bath. A copper foil fabricated by an electrolytic method is generally called "electrolytic copper foil".

The anode active material layer 22B contains one or more of anode materials capable of inserting and extracting lithium ions as anode active materials, and may also contain other materials such as an anode binder and an anode electric conductor as necessary. Details of the anode binder and the anode electric conductor are, for example, similar to those of the cathode binder and the cathode electric conductor, respectively. However, the chargeable capacity of the anode material is preferably larger than the discharge capacity of the cathode 21 in order to prevent lithium metal from being unintentionally precipitated on the anode 22 in the middle of charge.

The anode material is a carbon material. In the carbon material, its crystal structure change at the time of insertion and extraction of lithium ions is extremely small. Therefore, the carbon material provides high energy density and superior cycle characteristics. Further, the carbon material functions as an anode electric conductor as well. Examples of the carbon material include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material include pyrolytic carbons, cokes, glassy carbon fiber, an organic polymer compound fired body, activated carbon, and carbon blacks. Of the foregoing, examples of the cokes include pitch coke, needle coke, and petroleum coke. The organic polymer compound fired body is obtained by firing (carbonizing) a polymer compound such as a phenol resin and a furan resin at appropriate temperature. In addition thereto, the carbon material may be low crystalline carbon or amorphous carbon heat-treated at temperature of about 1000 deg C. or less. It is to be noted that the shape of the carbon material may be any of a fibrous shape, a spherical shape, a granular shape, and a scale-like shape.

It is to be noted that the anode active material layer 22B may further contain other types of anode material as long as such an anode material contains a carbon material as an anode active material. Examples of such other type of anode material include a material containing one or more of metal elements and metalloid elements capable of forming an alloy with Li as constituent elements. Examples of the metal elements and metalloid elements include Mg, B, Al, Ga, In, Si, Ge, Sn, Pb, Bi, Cd, Ag, Zn, Hf, Zr, Y, Pd, and Pt. In particular, Si, Sn, or both are preferable. Si and Sn have a superior ability of inserting and extracting lithium ions, and therefore, provide high energy density. Further, other anode material may be, for example, a metal oxide, a polymer compound, or the like. Examples of the metal oxide include iron oxide, ruthenium oxide, and molybdenum oxide. Examples of the polymer compound include polyacetylene, polyaniline, and polypyrrole.

The anode active material layer 22B is formed by, for example, a coating method, a firing method (sintering method), or a combination of two or more of these methods. The coating method is a method in which, for example, after a particulate (powder) anode active material is mixed with an anode binder and/or the like, the mixture is dispersed in a solvent such as an organic solvent, and the anode current collector is coated with the resultant. As the firing method, a publicly-known technique may be used. Examples of the firing method include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium ions is preferably larger than the electrochemical equivalent of the cathode. Further, in the case where the open circuit voltage (that is, a battery voltage) in completely-charged state is equal to or greater than 4.25 V, the extraction amount of lithium ions per unit mass is larger than that in the case where the open circuit voltage is 4.2 V even if the same cathode active material is used. Therefore, amounts of the cathode active material and the anode active material are adjusted accordingly. Thereby, high energy density is obtainable.

The thickness of the anode active material layer 22B is equal to or larger than 30 μm, and more specifically, is from 30 μm to 100 μm both inclusive. In the case where the thickness of the anode active material layer 22B is in the foregoing range, and the electrolytic solution contains an after-mentioned unsaturated cyclic ester carbonate, the chemical stability of the electrolytic solution is significantly improved compared to in the case where the thickness of the anode active material layer 22B is out of the foregoing range. Thereby, even if the secondary battery is repeatedly charged and discharged, or the secondary battery is stored at high temperature, a decomposition reaction of the electrolytic solution is suppressed.

The foregoing thickness of the anode active material layer 22B refers to the thickness of one anode active material layer 22B, that is, the thickness of the anode active material layer 22B on one side of the anode current collector 22A. Therefore, in the case where the anode active material layer 22B is provided only on one side of the anode current collector 22A, the foregoing thickness of the anode active material layer 22B refers to the thickness of that anode active material layer 22B on one side of the anode current collector 22A. On the other hand, in the case where the anode active material layers 22B are respectively provided on both sides of the anode current collector 22A, the foregoing thickness of the anode active material layer 22B refers to the thickness of each anode active material layer 22B.

Although the volume density of the anode active material layer 22B is not particularly limited, in particular, the volume density thereof is preferably from 1.4 g/cm$^3$ to 1.95 g/cm$^3$ both inclusive. In this case, the volume density thereof is more preferably from 1.6 g/cm$^3$ to 1.95 g/cm$^3$ both inclusive, and much more preferably from 1.6 g/cm$^3$ to 1.85 g/cm$^3$ both inclusive. One reason for this is that, in these cases, while energy density and/or the like is secured, the chemical stability of the electrolytic solution is further improved. More specifically, in the case where the volume density of the anode active material layer 22B is smaller than 1.4 g/cm$^3$, there is a possibility that sufficient energy density is not obtained. On the other hand, in the case where the volume density of the anode active material layer 22B is larger than 1.95 g/cm$^3$, efficiency of inserting and extracting lithium ions may be lowered, and impregnation characteristics of the electrolytic solution with respect to the anode active material layer 22B may be lowered.

In the case where the anode active material layer 22B contains other materials such as an anode binder together with the anode active material, the mixture ratio between the anode active material and other materials is not particularly limited. Specifically, the mixture ratio (weight ratio) between the anode active material and other materials is preferably from 99:1 to 85:15. Thereby, while energy density and/or the like is secured, the chemical stability of the electrolytic solution is further improved. More specifically, in the case where the ratio of the anode active material is excessively small, there is a possibility that sufficient energy density is not obtainable. On the other hand, in the case where the ratio of the anode active material is excessively large, adhesive characteristics and the like may be lowered.

[Separator]

The separator 23 separates the cathode 21 from the anode 22, and passes lithium ions while preventing current short circuit resulting from contact of both electrodes. The separator 23 is, for example, a porous film made of a synthetic resin, ceramics, or the like. The separator 23 may be a laminated film in which two or more types of porous films are laminated. Examples of the synthetic resin include polytetrafluoroethylene, polypropylene, and polyethylene.

In particular, the separator 23 may include, for example, the foregoing porous film (base material layer) and a polymer compound layer provided on one surface or both surfaces of the base material layer. Thereby, adhesion characteristics of the separator 23 with respect to the cathode 21 and the anode 22 are improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance of the secondary battery is less likely to be increased, and battery swollenness is suppressed.

The polymer compound layer contains, for example, a polymer material such as polyvinylidene fluoride, since such a polymer material has a superior physical strength and is electrochemically stable. However, the polymer material may be a material other than polyvinylidene fluoride. The polymer compound layer is formed as follows, for example. That is, after a solution in which the polymer material is dissolved is prepared, the base material layer is coated with the solution, and the resultant is subsequently dried. Alternatively, the base material layer may be soaked in the solution and may be subsequently dried.

[Electrolytic Solution]

The separator 23 is impregnated with an electrolytic solution as a liquid electrolyte. The electrolytic solution contains one or more of unsaturated cyclic ester carbonates represented by the following Formula (1) (hereinafter, simply referred to as "unsaturated cyclic ester carbonate"). However, the electrolytic solution may contain other material such as a solvent and an electrolyte salt.

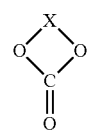

(1)

In Formula (1), X is a divalent group in which m-number of >C=CR1R2 and n-number of >CR3R4 are bonded in any order. Each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of R1 to R4 may be bonded to each other. m and n satisfy m≥1 and n≥0.

The unsaturated cyclic ester carbonate refers to a cyclic ester carbonate having one or more unsaturated bonds (>C=C< as carbon-carbon double bonds). One reason why the electrolytic solution contains the unsaturated cyclic ester carbonate is that, as described above, in the case where the thickness of the anode active material layer 22B is equal to or larger than 30 μm, and the electrolytic solution contains the unsaturated cyclic ester carbonate, the chemical stability of the electrolytic solution is significantly improved.

More specifically, in the case where the thickness of the anode active material layer 22B is less than 30 μm, even if the electrolytic solution contains the unsaturated cyclic ester carbonate, the chemical stability of the electrolytic solution is not improved. One reason for this may be that, since at the time of charge, an expansion amount per unit area of the anode 22 is small and an amount of reaction between the anode 22 and the electrolytic solution is small, a function of suppressing decomposition of the electrolytic solution by the unsaturated cyclic ester carbonate is not substantially exercised. On the other hand, in the case where the thickness of the anode active material layer 22B is equal to or larger than 30 μm, and the electrolytic solution contains the unsaturated cyclic ester carbonate, the chemical stability of the electrolytic solution is improved. One reason for this may be that, since, at the time of charge, an expansion amount per unit area of the anode 22 is large and an amount of reaction between the anode 22 and the electrolytic solution is large, a function of suppressing decomposition of the electrolytic solution by the unsaturated cyclic ester carbonate is substantially exercised. Such a tendency that the chemical stability of the electrolytic solution is improved is significant under strict conditions such as a high-temperature environment.

X in Formula (1) is a group obtained by bonding m-number of >C=CR1R2 to n-number of >CR3R4 so that the valency becomes divalent as a whole (one bonding hand exists on each of both ends). Adjacent groups (groups bonded to each other) may be the same type of group such as >C=CR1R2 and >C=CR1R2, or may be different from each other such as >C=CR1-R2 and >CR3R4. That is, the number (m) of >C=CR1R2 used for forming the divalent group and the number (n) of >CR3R4 used for forming the divalent group may be any number, and the bonding order thereof may also be any order.

While >C=CR1R2 is a divalent unsaturated group having the foregoing carbon-carbon double bond, >CR3R4 is a divalent saturated group not having a carbon-carbon double bond. Since n satisfies n≥0, >CR3R4 as a saturated group is not necessarily included in X. On the other hand, since m satisfies m≥1, it may be necessary to include one or more >C=CR1R2 as an unsaturated group in X typically. Therefore, X may be configured of only >C=CR1R2, or may be configured of both >C=CR1R2 and >CR3R4. One reason for this is that it may be necessary to include one or more unsaturated groups in a chemical structure of the unsaturated cyclic ester carbonate.

Values of m and n are not particularly limited as long as the conditions of m≥1 and n≥0 are satisfied. In particular, in the case where >C=CR1R2 is >C=CH$_2$ and >CR3R4 is >CH$_2$, (m+n)≤5 is preferably satisfied. One reason for this is that, in this case, the carbon number of X is not excessively large, and therefore, the solubility and the compatibility of the unsaturated cyclic ester carbonate are secured.

It is to be noted that any two or more of R1 to R4 in >C=CR1R2 and >CR3R4 may be bonded to one another, and the bonded groups may form a ring. As an example, R1 may be bonded to R2, R3 may be bonded to R4, and R2 may be bonded to R3 or R4.

Details of R1 to R4 are described below. R1 to R4 may be the same type of group, or may be groups different from one another. Any two or three of R1 to R4 may be the same type of group.

Each type of R1 to R4 is not particularly limited as long as each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. One reason for this is that, since, in this case, X has one or more carbon-carbon double bonds (>C=CR1R2), the foregoing advantage is obtainable without depending on the types of R1 to R4.

The halogen group is, for example, one or more of a fluorine group (—F), a chlorine group (—Cl), a bromine group (—Br), an iodine group (—I), and the like. In particular, the fluorine group is preferable, since a higher effect is thereby obtainable.

"Monovalent hydrocarbon group" is a generic term used to refer to monovalent groups configured of C and H, and may have a straight-chain structure or a branched structure having one or more side chains. Examples of the monovalent hydrocarbon group include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive. One reason for this is that the foregoing advantage is thereby obtained while the solubility, the compatibility, and the like of the unsaturated cyclic ester carbonate are secured.

More specific examples of the alkyl group include a methyl group (—CH$_3$), an ethyl group (—C$_2$H$_5$), and a propyl group (—C$_3$H$_7$). Examples of the alkenyl group include a vinyl group (—CH=CH$_2$) and an allyl group (—CH$_2$—CH=CH$_2$). Examples of the alkynyl group include an ethynyl group (—CCH). Examples of the aryl group include a phenyl group and a naphtyl group. Examples of the cycloalkyl group include a cyclopropyl group, a cyclobutyl group, a cyclopentyl group, a cyclohexyl group, a cycloheptyl group, and a cyclooctyl group.

"Monovalent oxygen-containing hydrocarbon group" is a generic term used to refer to monovalent groups configured of O together with C and H. Examples of the monovalent oxygen-containing hydrocarbon group include an alkoxy group with carbon number from 1 to 12 both inclusive. One reason for this is that the foregoing advantage is thereby obtained while the solubility, the compatibility, and the like of the unsaturated cyclic ester carbonate are secured. More specific examples of the alkoxy group include a methoxy group (—OCH$_3$) and an ethoxy group (—OC$_2$H$_5$).

It is to be noted that a group obtained by bonding two or more of the foregoing alkyl group and the like so that the whole valency becomes monovalent may be used. Examples thereof include a group obtained by bonding an alkyl group to an aryl group and a group obtained by bonding an alkyl group to a cycloalkyl group. More specific examples of the group obtained by bonding an alkyl group to an aryl group include a benzil group.

"Monovalent halogenated hydrocarbon group" is obtained by substituting (halogenating) each of part or all of hydrogen groups (—H) out of the foregoing monovalent hydrocarbon group by a halogen group. Similarly, "monovalent halogenated oxygen-containing hydrocarbon group" is obtained by substituting each of part or all of hydrogen groups out of the foregoing monovalent oxygen-containing hydrocarbon group by a halogen group. In either case, types of the halogen group substituting for a hydrogen group are similar to the types of the halogen group described above.

Examples of the monovalent halogenated hydrocarbon group include a group obtained by halogenating the foregoing alkyl group or the like. That is, the monovalent halogenated hydrocarbon group is a group obtained by substituting each of part or all of hydrogen groups of the foregoing alkyl group or the like by a halogen group. More specific examples of the group obtained by halogenating an alkyl group or the like include a trifluoromethyl group (—CF$_3$) and a pentafluoroethyl group (—C$_2$F$_5$). Further, examples of the monovalent halogenated oxygen-containing hydrocarbon group include a group obtained by substituting each of part or all of hydrogen groups of the foregoing alkoxy group or the like by a halogen group. More specific examples of the group obtained by halogenating an alkoxy group or the like include a trifluoromethoxy group (—OCF$_3$) and a pentafluoroethoxy group (—OC$_2$F$_5$).

It is to be noted that each of R1 to R4 may be a group other than the foregoing groups. Specifically, each of R1 to R4 may be, for example, a derivative of each of the foregoing groups. The derivative is obtained by introducing one or more substituent groups to each of the foregoing groups. Substituent group types may be any type.

In particular, the unsaturated cyclic ester carbonate is preferably represented by the following Formula (2) or the following Formula (3). One reason for this is that, in this case, the foregoing advantage is obtained, and such compounds are easily synthesized.

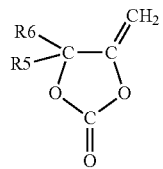

(2)

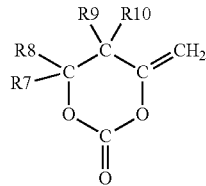

(3)

In Formulas (2) and (3), each of R5 to R10 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. R5 and R6 may be bonded to each other, and any two or more of R7 to R10 may be bonded to one another.

Focusing attention on a relation between Formula (1) and Formula (2), the unsaturated cyclic ester carbonate represented by Formula (2) has, as X in Formula (1), one unsaturated group (>C=CH$_2$) corresponding to >C=CR1R2 and one saturated group (>CR5R6) corresponding to >CR3R4. On the other hand, focusing attention on a relation between Formula (1) and Formula (3), the unsaturated cyclic ester carbonate represented by Formula (3) has, as X, one unsaturated group (>C=CH$_2$) corresponding to >C=CR1R2 and two saturated groups (>CR7R8 and >CR9R10) corresponding to >CR3R4. However, the foregoing one unsaturated group and the foregoing two saturated groups are bonded in order of >CR7R8, >CR9R10, and C=CH$_2$.

Details of R5 and R6 in Formula (2) and R7 to R10 in Formula (3) are similar to those of R1 to R4 in Formula (1), and therefore, descriptions thereof will be omitted.

Specific examples of the unsaturated cyclic ester carbonate include compounds represented by the following Formula (1-1) to the following Formula (1-56). Such unsaturated cyclic ester carbonates include a geometric isomer. However, specific examples of the unsaturated cyclic ester carbonate are not limited to the compounds listed in Formula (1-1) to Formula (1-56).

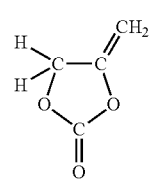

(1-1)

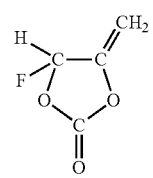

(1-2)

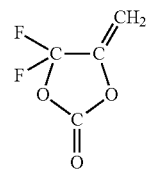

(1-3)

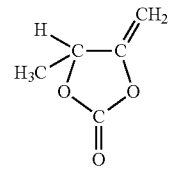

(1-4)

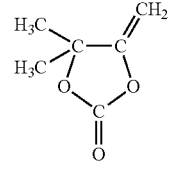

(1-5)

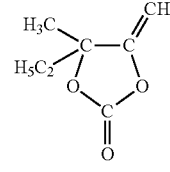

(1-6)

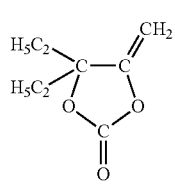 (1-7)
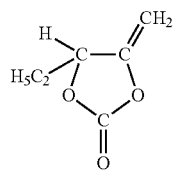 (1-8)
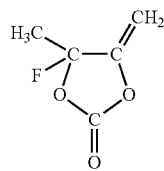 (1-9)
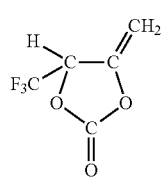 (1-10)
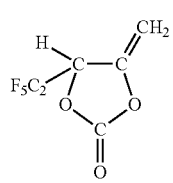 (1-11)
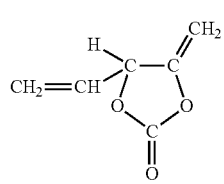 (1-12)
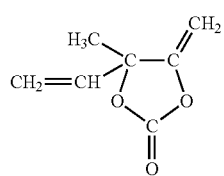 (1-13)
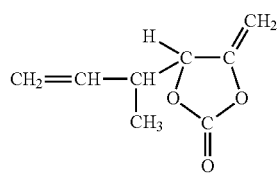 (1-14)
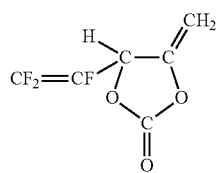 (1-15)
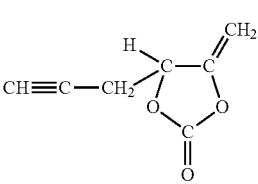 (1-16)
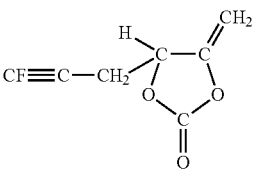 (1-17)
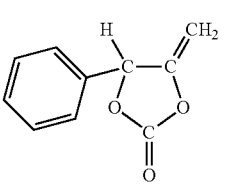 (1-18)
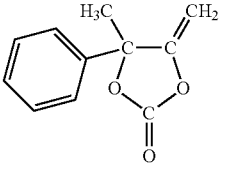 (1-19)
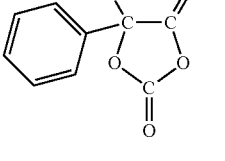 (1-20)
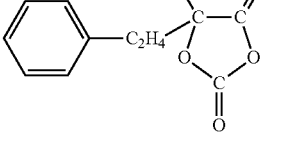 (1-21)
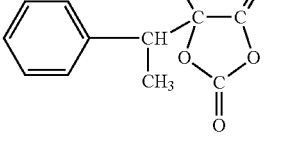 (1-22)
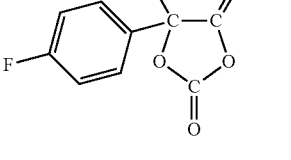 (1-23)
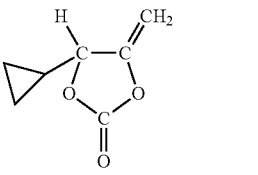 (1-24)

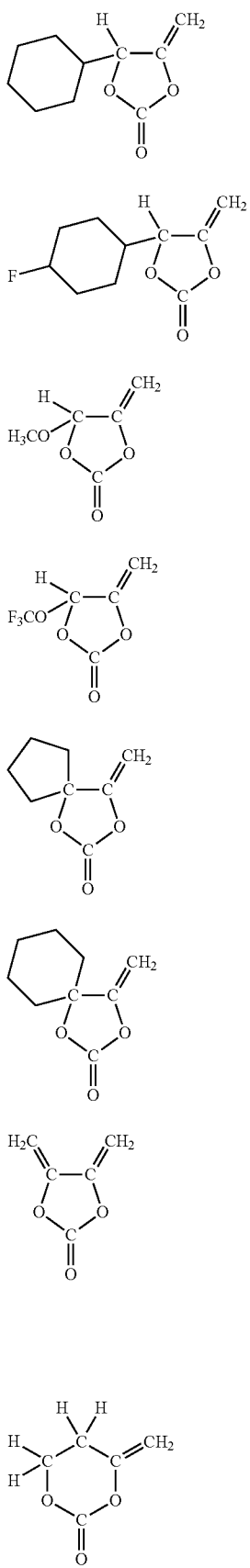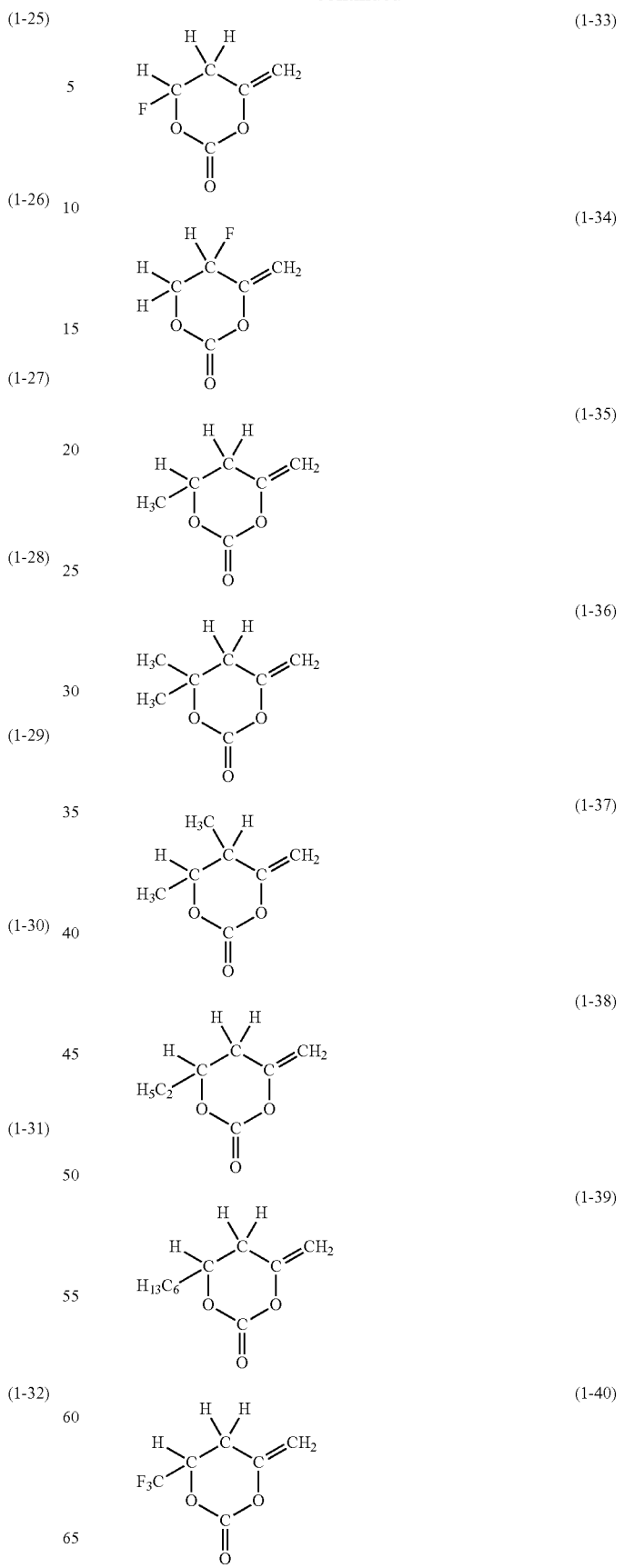

(1-41) 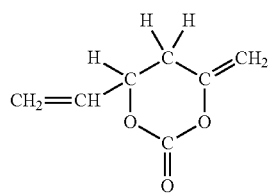
(1-42) 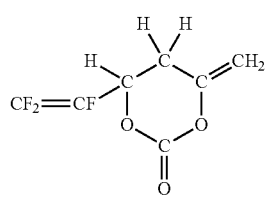
(1-43) 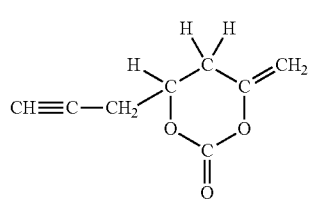
(1-44) 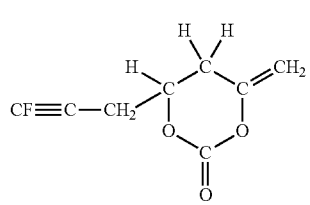
(1-45) 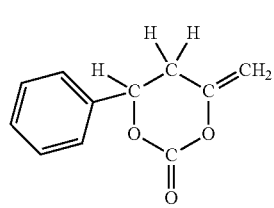
(1-46) 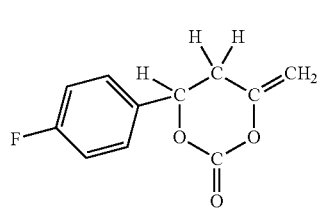
(1-47) 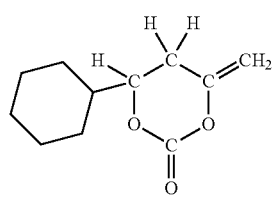
(1-48) 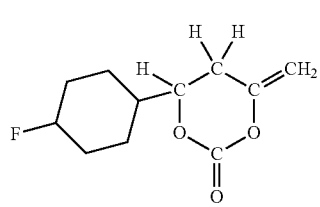
(1-49) 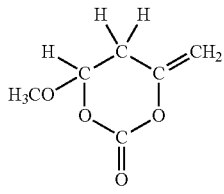
(1-50) 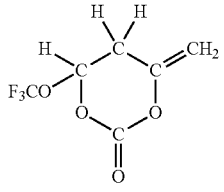
(1-51) 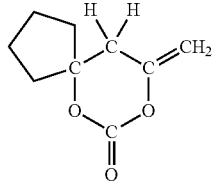
(1-52) 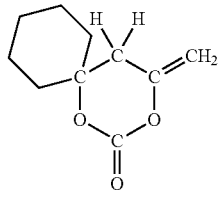
(1-53) 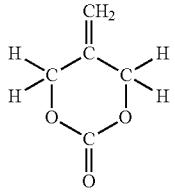
(1-54) 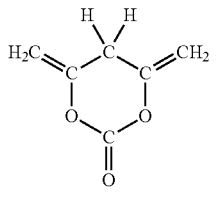
(1-55) 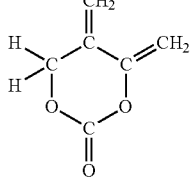
(1-56) 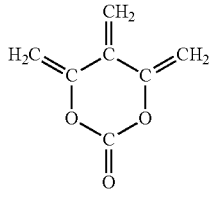

In particular, Formula (1-1) and the like corresponding to Formula (2) or Formula (1-32) and the like corresponding to Formula (3) are preferable, since a higher effect is thereby obtainable.

Although the content of the unsaturated cyclic ester carbonate in the electrolytic solution is not particularly limited, in particular, the content thereof is preferably from 0.01 wt % to 10 wt % both inclusive, and more preferably from 0.5 wt % to 10 wt % both inclusive since a higher effect is thereby obtainable.

The solvent used for the electrolytic solution contains one or more of nonaqueous solvents such as an organic solvent (excluding the foregoing unsaturated cyclic ester carbonate).

Examples of the nonaqueous solvents include a cyclic ester carbonate, a chain ester carbonate, lactone, a chain carboxylic ester, and nitrile, since thereby, a superior battery capacity, superior cycle characteristics, superior conservation characteristics, and the like are obtained. Examples of the cyclic ester carbonate include ethylene carbonate, propylene carbonate, and butylene carbonate. Examples of the chain ester carbonate include dimethyl carbonate, diethyl carbonate, ethyl methyl carbonate, and methylpropyl carbonate. Examples of the lactone include γ-butyrolactone and γ-valerolactone. Examples of the carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, glutaronitrile, adiponitrile, methoxyacetonitrile, and 3-methoxypropionitrile.

In addition thereto, the nonaqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Thereby, a similar advantage is obtained.

In particular, one or more of ethylene carbonate, propylene carbonate, dimethyl carbonate, diethyl carbonate, and ethyl methyl carbonate are preferable, since thereby, a superior battery capacity, superior cycle characteristics, superior conservation characteristics, and the like are obtained. In this case, a combination of a high viscosity (high dielectric constant) solvent (for example, specific dielectric constant ε≥30) such as ethylene carbonate and propylene carbonate and a low viscosity solvent (for example, viscosity≤1 mPa·s) such as dimethyl carbonate, ethylmethyl carbonate, and diethyl carbonate is more preferable. One reason for this is that the dissociation property of the electrolyte salt and ion mobility are improved.

In particular, the solvent preferably contains one or more of other unsaturated cyclic ester carbonates represented by the following Formula (4) and the following Formula (5). One reason for this is that a stable protective film is formed mainly on the surface of the anode 22 at the time of charge and discharge, and therefore, a decomposition reaction of the electrolytic solution is suppressed. R11 and R12 may be the same type of group, or may be groups different from each other. Further, R13 to R16 may be the same type of group, or may be groups different from one another. Alternatively, part of R13 to R16 may be the same type of group. The content of other unsaturated cyclic ester carbonate in the solvent is not particularly limited, and is, for example, from 0.01 wt % to 10 wt % both inclusive. However, specific examples of other unsaturated cyclic ester carbonate are not limited to the after-mentioned compounds.

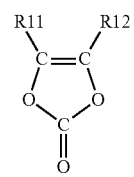

(4)

In Formula (4), each of R11 and R12 is one of a hydrogen group and an alkyl group.

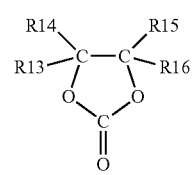

(5)

In Formula (5), each of R13 to R16 is one of a hydrogen group, an alkyl group, a vinyl group, and an allyl group. One or more of R13 to R16 are each a vinyl group or an allyl group.

Other unsaturated cyclic ester carbonate represented by Formula (4) is a vinylene-carbonate-based compound. Each type of R11 and R12 is not particularly limited as long as each of R11 and R12 is one of a hydrogen group and an alkyl group. Examples of the alkyl group include a methyl group and an ethyl group, and the carbon number of the alkyl group is preferably from 1 to 12 both inclusive, since superior solubility and superior compatibility are thereby obtained. Specific examples of the vinylene-carbonate-based compounds include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, and 4,5-diethyl-1,3-dioxole-2-one. It is to be noted that each of R11 and R12 may be a group obtained by substituting each of part or all of hydrogen groups of the alkyl group by a halogen group. In this case, specific examples of the vinylene-carbonate-based compounds include 4-fluoro-1,3-dioxole-2-one and 4-trifluoromethyl-1,3-dioxole-2-one. In particular, vinylene carbonate is preferable, since vinylene carbonate is easily available and provides a high effect.

Other unsaturated cyclic ester carbonate represented by Formula (5) is a vinylethylene-carbonate-based compound. Each type of R13 to R16 is not particularly limited as long as each of R13 to R16 is one of a hydrogen group, an alkyl group, a vinyl group, and an allyl group, where one or more of R13 to R16 are each one of a vinyl group and an allyl group. The type and the carbon number of the alkyl group are similar to those of R11 and R12. Specific examples of the vinylethylene-carbonate-based compounds include vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinylethylene carbonate is preferable, since vinylethylene carbonate is easily available, and provides a high effect. It goes without saying that all of R13 to R16 may be vinyl groups or allyl groups. Alternatively, some of R13 to R16 may be vinyl groups, and the others thereof may be allyl groups.

It is to be noted that other unsaturated cyclic ester carbonate may be the compounds represented by Formula (4) and Formula (5), or may be catechol carbonate having a benzene ring.

Further, the solvent preferably contains one or more of halogenated ester carbonates represented by the following Formula (6) and the following Formula (7). One reason for this is that a stable protective film is formed mainly on the surface of the anode 22 at the time of charge and discharge, and therefore, a decomposition reaction of the electrolytic solution is suppressed. The halogenated ester carbonate represented by Formula (6) is a cyclic ester carbonate having one or more halogens as constituent elements (halogenated cyclic ester carbonate). The halogenated ester carbonate represented by Formula (7) is a chain ester carbonate having one or more halogens as constituent elements (halogenated chain ester carbonate). R17 to R20 may be the same type of group, or may be groups different from one another. Alternatively, part of R17 to R20 may be the same type of group. The same is applied to R21 to R26. Although the content of the halogenated ester carbonate in the solvent is not particularly limited, the content thereof is, for example, from 0.01 wt % to 50 wt % both inclusive. However, specific examples of the halogenated ester carbonate are not limited to the compounds described below.

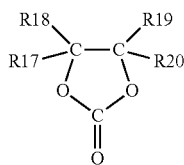

(6)

In Formula (6), each of R17 to R20 is one of a hydrogen group, a halogen group, an alkyl group, and a halogenated alkyl group. One or more of R17 to R20 are each one of a halogen group and a halogenated alkyl group.

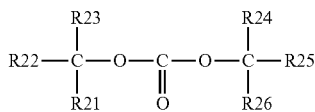

(7)

In Formula (7), each of R21 to R26 is one of a hydrogen group, a halogen group, an alkyl group, and a halogenated alkyl group. One or more of R21 to R26 are each a halogen group or a halogenated alkyl group.

Although halogen type is not particularly limited, in particular, fluorine (F), chlorine (Cl), or bromine (Br) is preferable, and fluorine is more preferable since thereby, a higher effect is obtained compared to other halogens. However, the number of halogens is more preferably two than one, and further may be three or more. One reason for this is that, since thereby, an ability of forming a protective film is improved, a more rigid and stable protective film is formed.

Examples of the halogenated cyclic ester carbonate include compounds represented by the following Formula (6-1) to the following Formula (6-21). Such compounds include a geometric isomer. In particular, 4-fluoro-1,3-dioxolane-2-one represented by Formula (6-1) or 4,5-difluoro-1,3-dioxolane-2-one represented by Formula (6-3) is preferable, and the latter is more preferable. Further, as 4,5-difluoro-1,3-dioxolane-2-one, a trans isomer is more preferable than a cis isomer, since the trans isomer is easily available and provides a high effect. Examples of the halogenated chain ester carbonate include fluoromethyl methyl carbonate, bis (fluoromethyl) carbonate, and difluoromethyl methyl carbonate.

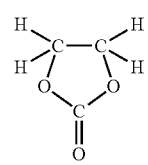

(6-1)

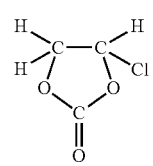

(6-2)

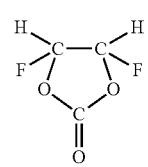

(6-3)

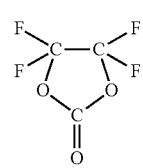

(6-4)

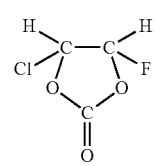

(6-5)

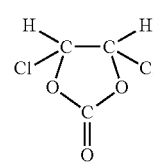

(6-6)

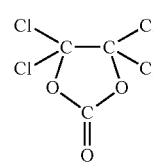

(6-7)

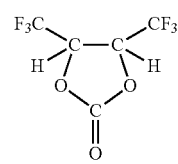

(6-8)

(6-9) 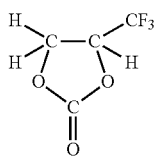

(6-10) 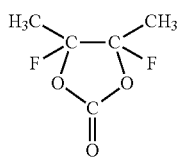

(6-11) 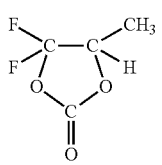

(6-12) 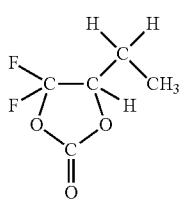

(6-13) 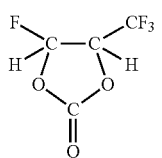

(6-14) 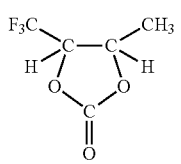

(6-15) 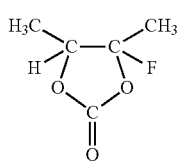

(6-16) 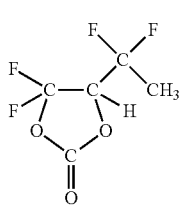

(6-17) 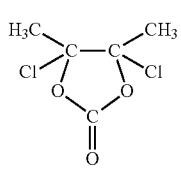

(6-18) 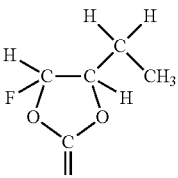

(6-19) 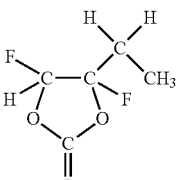

(6-20) 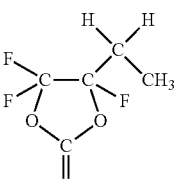

(6-21) 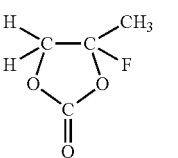

Further, the solvent preferably contains sultone (cyclic sulfonic ester), since the chemical stability of the electrolytic solution is more improved thereby. Examples of sultone include propane sultone and propene sultone. Although the sultone content in the solvent is not particularly limited, for example, the sultone content is from 0.5 wt % to 5 wt % both inclusive. Specific examples of sultone are not limited to the foregoing compounds.

Further, the solvent preferably contains an acid anhydride since the chemical stability of the electrolytic solution is thereby further improved. Examples of the acid anhydrides include a carboxylic anhydride, a disulfonic anhydride, and a carboxylic acid sulfonic acid anhydride. Examples of the carboxylic anhydride include a succinic anhydride, a glutaric anhydride, and a maleic anhydride. Examples of the disulfonic anhydride include an ethane disulfonic anhydride and a propane disulfonic anhydride. Examples of the carboxylic acid sulfonic acid anhydride include a sulfobenzoic anhydride, a sulfopropionic anhydride, and a sulfobutyric anhydride. Although the content of the acid anhydride in the solvent is not particularly limited, for example, the content thereof is from 0.5 wt % to 5 wt % both inclusive. However, specific examples of the acid anhydrides are not limited to the foregoing compounds.

The electrolyte salt used for the electrolytic solution may contain, for example, one or more of salts such as a lithium salt. However, the electrolyte salt may contain, for example, a salt other than the lithium salt (for example, a light metal salt other than the lithium salt).

Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate (LiCF$_3$SO$_3$), lithium tetrachloroaluminate (LiAlCl$_4$), dilithium hexafluorosilicate (Li$_2$SiF$_6$), lithium chloride (LiCl), and lithium bromide (LiBr). Thereby, a superior battery capacity, superior cycle characteristics, superior conservation characteristics, and the like are obtained. However, specific examples of the lithium salt are not limited to the foregoing compounds, and may be other compounds.

In particular, one or more of LiPF$_6$, LiBF$_4$, LiClO$_4$, and LiAsF$_6$ are preferable, and LiPF$_6$ is more preferable, since the internal resistance is thereby lowered, and therefore, a higher effect is obtained.

In particular, the electrolyte salt preferably contains one or more of compounds represented by the following Formula (8) to the following Formula (10), since a higher effect is obtained thereby. It is to be noted that R31 and R33 may be the same type of group, or may be groups different from each other. The same is applied to R41 to R43 and to R51 and R52. However, specific examples of the compounds represented by Formula (8) to Formula (10) are not limited to the after-mentioned compounds.

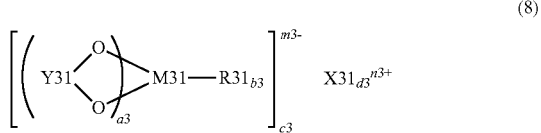
(8)

In Formula (8), X31 is one of Group 1 elements, Group 2 elements in the long-period periodic table, and Al. M31 is one of transition metals, Group 13 elements, Group 14 elements, and Group 15 elements in the long-period periodic table. R31 is a halogen group. Y31 is one of —C(=O)—R32-C(=O)—, —C(=O)—CR33$_2$-, and —C(=O)—C(=O)—. R32 is one of an alkylene group, a halogenated alkylene group, an arylene group, and a halogenated arylene group. R33 is one of an alkyl group, a halogenated alkyl group, an aryl group, and a halogenated aryl group. a3 is one of integer numbers 1 to 4 both inclusive. b3 is one of integer numbers 0, 2, and 4. Each of c3, d3, m3, and n3 is one of integer numbers 1 to 3 both inclusive.

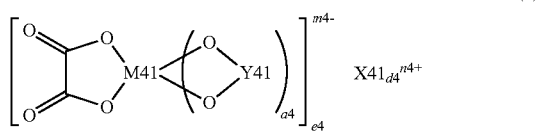
(9)

In Formula (9), X41 is one of Group 1 elements and Group 2 elements in the long-period periodic table. M41 is one of transition metals, Group 13 elements, Group 14 elements, and Group 15 elements in the long-period periodic table. Y41 is one of —C(=O)—(CR41$_2$)$_{b4}$-C(=O)—, —R43$_2$C—(CR42$_2$)$_{c4}$-C(=O)—, —R43$_2$C—(CR42$_2$)$_{c4}$-CR43$_2$-, —R43$_2$C—(CR42$_2$)$_{c4}$-S(=O)$_2$—, —S(=O)$_2$—(CR42$_2$)$_{d4}$-S(=O)$_2$—, and —C(=O)—(CR42$_2$)$_{d4}$-S(=O)$_2$—. Each of R41 and R43 is one of a hydrogen group, an alkyl group, a halogen group, and a halogenated alkyl group. One or more of R41 and R43 are each the halogen group or the halogenated alkyl group. R42 is one of a hydrogen group, an alkyl group, a halogen group, and a halogenated alkyl group. Each of a4, e4, and n4 is one of integer numbers 1 and 2. Each of b4 and d4 is one of integer numbers 1 to 4 both inclusive. c4 is one of integer numbers 0 to 4 both inclusive. Each of f4 and m4 is one of integer numbers 1 to 3 both inclusive.

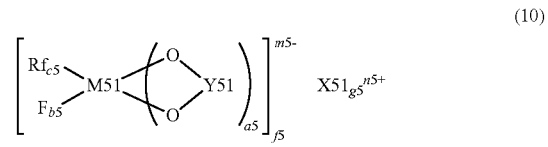
(10)

In Formula (10), X51 is one of Group 1 elements and Group 2 elements in the long-period periodic table. M51 is one of transition metals, Group 13 elements, Group 14 elements, and Group 15 elements in the long-period periodic table. Rf is one of a fluorinated alkyl group with carbon number from 1 to 10 both inclusive and a fluorinated aryl group with carbon number from 1 to 10 both inclusive. Y51 is one of —C(=O)—(CR51$_2$)$_{d5}$-C(=O)—, —R52$_2$C—(CR51$_2$)$_{d5}$-C(=O)—, —R52$_2$C—(CR51$_2$)$_{d5}$-CR52$_2$-, —R52$_2$C—(CR51$_2$)$_{d5}$-S(=O)$_2$—, —S(=O)$_2$—(CR51$_2$)$_{e5}$-S(=O)$_2$—, and —C(=O)—(CR51$_2$)$_{e5}$-S(=O)$_2$—. R51 is one of a hydrogen group, an alkyl group, a halogen group, and a halogenated alkyl group. R52 is one of a hydrogen group, an alkyl group, a halogen group, and a halogenated alkyl group, and one or more thereof are each a halogen group or a halogenated alkyl group. Each of a5, f5, and n5 is one of integer numbers 1 and 2. Each of b5, c5, and e5 is one of integer numbers 1 to 4 both inclusive. d5 is one of integer numbers 0 to 4 both inclusive. Each of g5 and m5 is one of integer numbers 1 to 3 both inclusive.

It is to be noted that Group 1 elements include H, Li, Na, K, Rb, Cs, and Fr. Group 2 elements include Be, Mg, Ca, Sr, Ba, and Ra. Group 13 elements include B, Al, Ga, In, and Tl. Group 14 elements include C, Si, Ge, Sn, and Pb. Group 15 elements include N, P, As, Sb, and Bi.

Examples of the compound represented by Formula (8) include compounds represented by Formula (8-1) to Formula (8-6). Examples of the compound represented by Formula (9) include compounds represented by Formula (9-1) to Formula (9-8). Examples of the compound represented by Formula (10) include a compound represented by Formula (10-1).

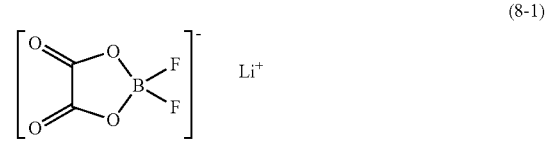
(8-1)

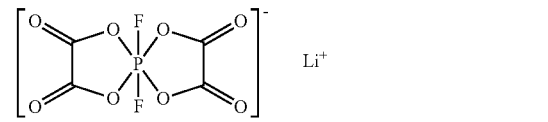
(8-2)

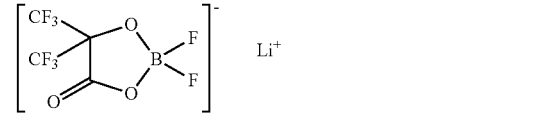
(8-3)

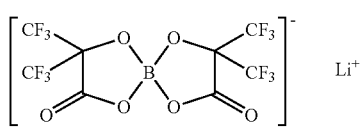
(8-4)

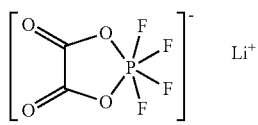
(8-5)

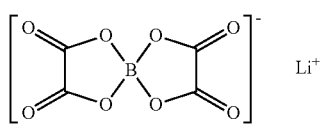
(8-6)

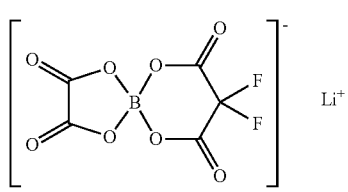
(9-1)

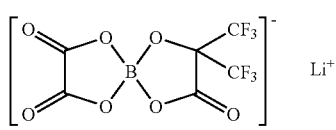
(9-2)

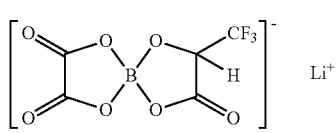
(9-3)

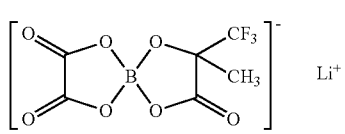
(9-4)

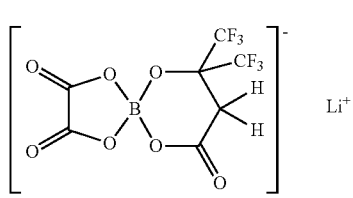
(9-5)

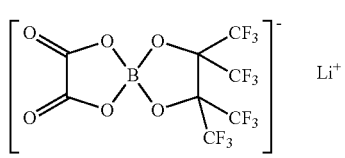
(9-6)

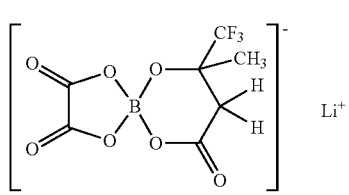
(9-7)

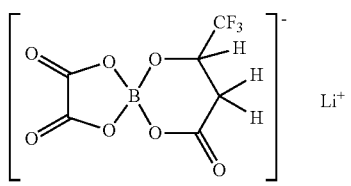
(9-8)

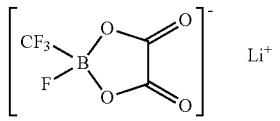
(10-1)

Further, the electrolyte salt preferably contains one or more of compounds represented by the following Formula (11) to the following Formula (13), since a higher effect is obtained thereby. It is to be noted that m and n may be the same value or values different from each other. The same is applied to p, q, and r. However, specific examples of the compounds represented by Formula (11) to Formula (13) are not limited to compounds described below.

$$\text{LiN}(C_mF_{2m+1}SO_2)(C_nF_{2n+1}SO_2) \quad (11)$$

In Formula (11), each of m and n is an integer number equal to or greater than 1.

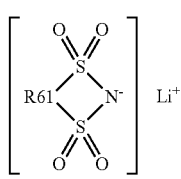
(12)

In Formula (12), R61 is a straight-chain or branched perfluoro alkylene group with carbon number from 2 to 4 both inclusive.

$$\text{LiC}(C_pF_{2p+1}SO_2)(C_qF_{2q+1}SO_2)(C_rF_{2r+1}SO_2) \quad (13)$$

In Formula (13), each of p, q, and r is an integer number equal to or greater than 1.

The compound represented by Formula (11) is a chain imide compound. Examples thereof include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium(trifluoromethanesulfonyl)(heptafluoropropanesulfonyl)imide (LiN(CF$_3$SO$_2$)(C$_3$F$_7$SO$_2$)), and lithium (trifluoromethanesulfonyl)(nonafluorobutanesulfonyl)imide (LiN(CF$_3$SO$_2$)(C$_4$F$_9$SO$_2$)).

The compound represented by Formula (12) is a cyclic imide compound. Examples thereof include compounds represented by Formula (12-1) to Formula (12-4).

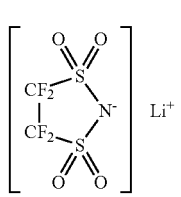
(12-1)

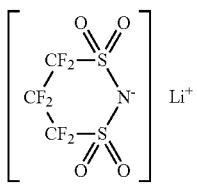

(12-2)

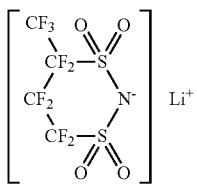

(12-3)

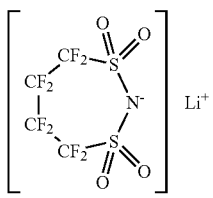

(12-4)

The compound represented by Formula (13) is a chain methyde compound. Examples thereof include lithium tris (trifluoromethanesulfonyl)methyde ($LiC(CF_3SO_2)_3$).

Although the content of the electrolyte salt is not particularly limited, in particular, the content thereof is preferably from 0.3 mol/kg to 3.0 mol/kg both inclusive with respect to the solvent, since high ion conductivity is obtained thereby.

[Operation of Secondary Battery]

In the secondary battery, for example, at the time of charge, lithium ions extracted from the cathode 21 are inserted in the anode 22 through the electrolytic solution. Further, at the time of discharge, lithium ions extracted from the anode 22 are inserted in the cathode 21 through the electrolytic solution.

[Method of Manufacturing Secondary Battery]

The secondary battery is manufactured, for example, by the following procedure.

First, the cathode 21 is fabricated. A cathode active material is mixed with a cathode binder, a cathode electric conductor, and/or the like as necessary to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. In this case, the cathode active material layer 21B may be formed only on a single surface of the cathode current collector 21A. Subsequently, the cathode active material layer 21B is compression-molded by using a roll pressing machine and/or the like while being heated as necessary. In this case, compression-molding may be repeated several times.

Further, the anode 22 is fabricated by a procedure similar to that of the cathode 21 described above. An anode active material is mixed with an anode binder, an anode electric conductor, and/or the like as necessary to prepare an anode mixture, which is subsequently dispersed in an organic solvent or the like to form paste anode mixture slurry. Subsequently, a single surface or both surfaces of the anode current collector 22A are coated with the anode mixture slurry, which is dried to form the anode active material layer 22B. Thereafter, the anode active material layer 22B is compression-molded as necessary.

Further, after an electrolyte salt is dispersed in a solvent, an unsaturated cyclic ester carbonate is added thereto to prepare an electrolytic solution.

Finally, the secondary battery is assembled by using the cathode 21 and the anode 22. The cathode lead 25 is attached to the cathode current collector 21A by using a welding method and/or the like, and the anode lead 26 is attached to the anode current collector 22A by using a welding method and/or the like. Subsequently, the cathode 21 and the anode 22 are layered with the separator 23 in between and are spirally wound, and thereby, the spirally wound electrode body 20 is fabricated. Thereafter, the center pin 24 is inserted in the center of the spirally wound electrode body. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by using a welding method and/or the like, and the end tip of the anode lead 26 is attached to the battery can 11 by using a welding method and/or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Function and Effect of Secondary Battery]

According to the cylindrical-type secondary battery, the anode active material layer 22B contains a carbon material, the thickness of the anode active material layer 22B is equal to or larger than 30 µm, and the electrolytic solution contains the unsaturated cyclic ester carbonate. In this case, as described above, the thickness of the anode active material layer 22B is appropriate on the relationship with the function of suppressing decomposition of the electrolytic solution by the unsaturated cyclic ester carbonate. Therefore, the function of suppressing decomposition of the electrolytic solution by the unsaturated cyclic ester carbonate is effectively exercised. Thereby, chemical stability of the electrolytic solution is specifically improved, and therefore, a decomposition reaction of the electrolytic solution is suppressed. Therefore, even if the secondary battery is charged and discharged, or stored, the electrolytic solution is less likely to be decomposed, and accordingly, superior battery characteristics are obtainable.

In particular, in the case where the content of the unsaturated cyclic ester carbonate in the electrolytic solution is from 0.01 wt % to 10 wt % both inclusive, higher effects are obtainable. Further, in the case where the unsaturated cyclic ester carbonate is one of the compounds represented by Formula (1-1) to Formula (1-56), and in particular, is the compound represented by Formula (2) or the compound represented by Formula (3), higher effects are obtainable. In addition thereto, in the case where the volume density of the anode active material layer 22B is from 1.4 $g/cm^3$ to 1.95 $g/cm^3$ both inclusive, further higher effects are obtainable.

[1-2. Laminated Film Type]

Figure 3:
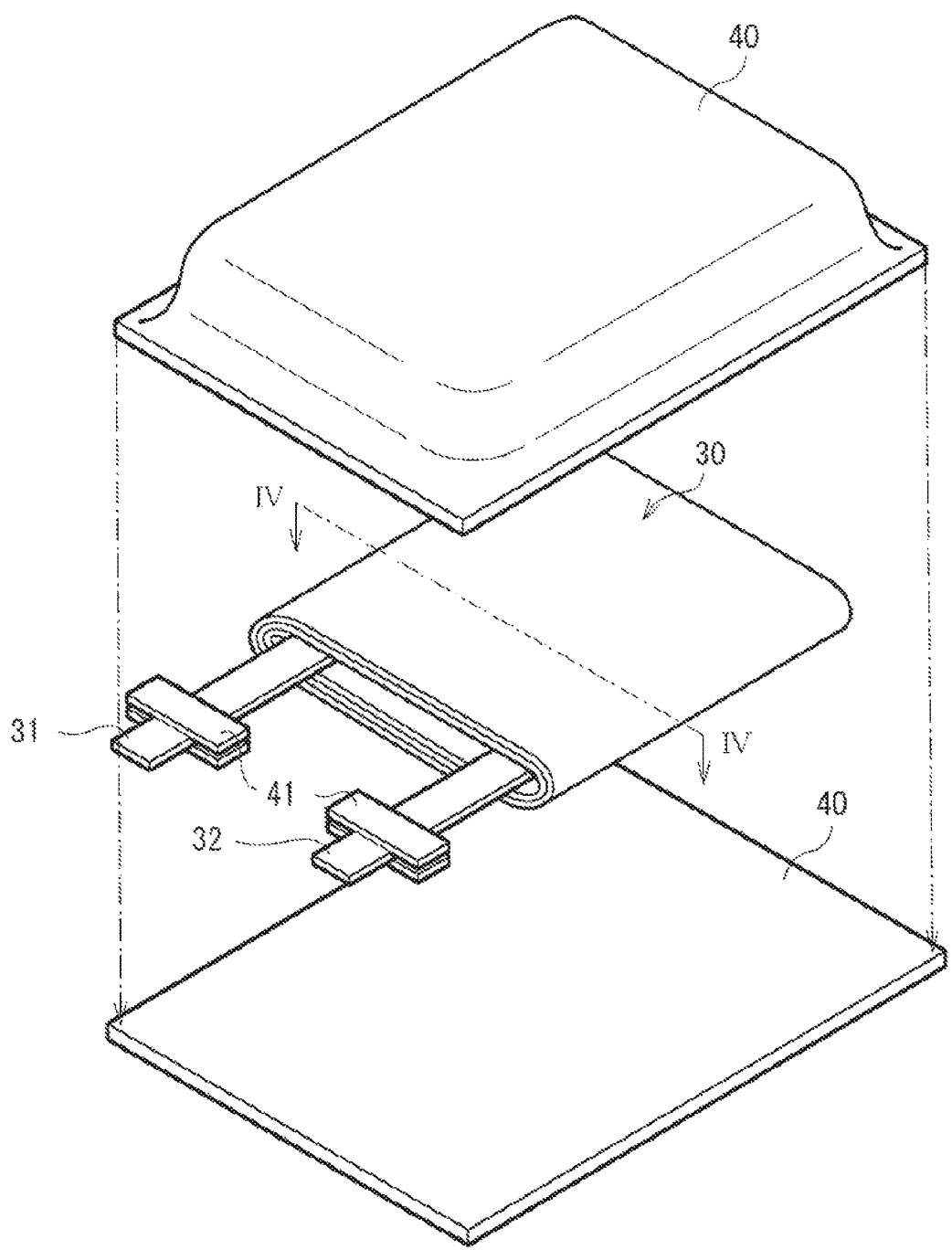
FIG. 3 is a perspective view illustrating a configuration of another secondary battery (laminated film type) according to the embodiment of the present application.
Figure 4:
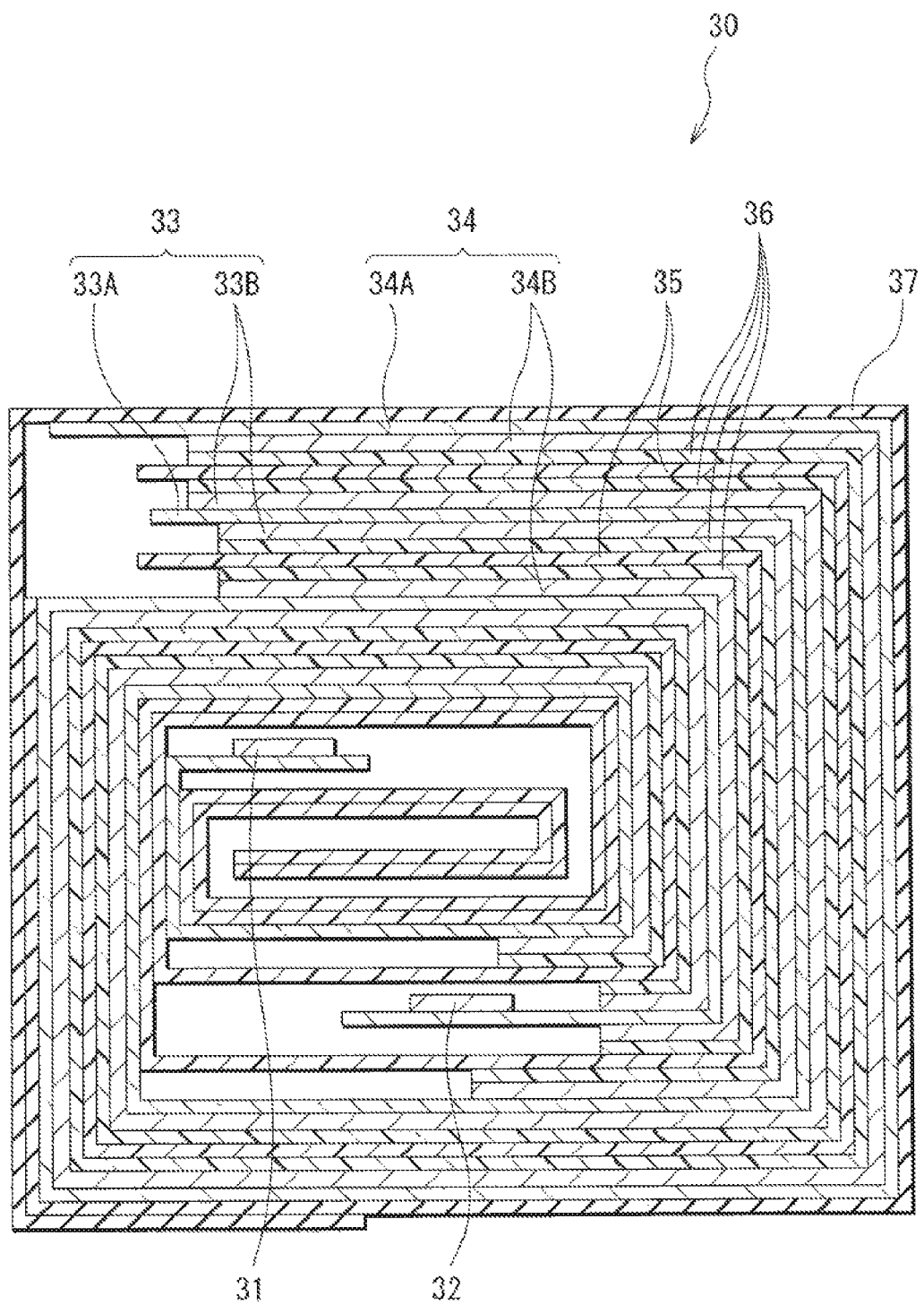
FIG. 4 is a cross-sectional view taken along a line IV-IV of a spirally wound electrode body illustrated in FIG. 3.

FIG. 3 illustrates an exploded perspective configuration of another secondary battery according to the embodiment of the present application. FIG. 4 illustrates an enlarged cross-section taken along a line IV-IV of a spirally wound electrode body 30 illustrated in FIG. 3. In the following description, the elements of the cylindrical-type secondary battery described above will be used as necessary.

[Whole Configuration of Secondary Battery]

The secondary battery herein described is, for example, what we call a laminated-film-type lithium ion secondary battery. In the secondary battery, the spirally wound electrode body 30 is contained in a film-like outer package member 40. In the spirally wound electrode body 30, a cathode 33 and an anode 34 are layered with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 are, for example, led out from inside to outside of the outer package member 40 in the same direction. The cathode lead 31 is made of, for example, a conductive material such as aluminum, and the anode lead 32 is made of, for example, a conducive material such as copper, nickel, and stainless steel. These conductive materials are in the shape of, for example, a thin plate or mesh.

The outer package member 40 is a laminated film in which, for example, a fusion bonding layer, a metal layer, and a surface protective layer are laminated in this order. In the laminated film, for example, the respective outer edges of the fusion bonding layers of two films are bonded to each other by fusion bonding, so that the fusion bonding layers and the spirally wound electrode body 30 are opposed to each other. The two films may be attached to each other by an adhesive, or the like. Examples of the fusion bonding layer include a film made of polyethylene, polypropylene, or the like. Examples of the metal layer include an aluminum foil. Examples of the surface protective layer include a film made of nylon, polyethylene terephthalate, or the like.

In particular, as the outer package member 40, an aluminum laminated film in which a polyethylene film, an aluminum foil, and a nylon film are laminated in this order is preferable. However, the outer package member 40 may be made of a laminated film having other laminated structure, a polymer film such as polypropylene, or a metal film.

An adhesive film 41 to protect from outside air intrusion is inserted between the outer package member 40 and the cathode lead 31 and between the outer package member 40 and the anode lead 32. The adhesive film 41 is made of a material having adhesion characteristics with respect to the cathode lead 31 and the anode lead 32. Examples of the material having adhesion characteristics include a polyolefin resin such as polyethylene, polypropylene, modified polyethylene, and modified polypropylene.

The cathode 33 has, for example, a cathode active material layer 33B on a single surface or both surfaces of a cathode current collector 33A. The anode 34 has, for example, an anode active material layer 34B on a single surface or both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. That is, the anode active material layer 34B contains a carbon material. The thickness of the anode active material layer 34B is equal to or larger than 30 μm, and is preferably from 30 μm to 100 μm both inclusive. Further, the configuration of the separator 35 is similar to the configuration of the separator 23.

In the electrolyte layer 36, an electrolytic solution is held by a polymer compound. The electrolyte layer 36 is what we call a gel electrolyte, since thereby, high ion conductivity (for example, 1 mS/cm or more at room temperature) is obtained and liquid leakage of the electrolytic solution is prevented. The electrolyte layer 36 may contain other material such as an additive as necessary.

Examples of the polymer compound include one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, and a copolymer of vinylidene fluoride and hexafluoro propylene. In particular, polyvinylidene fluoride or the copolymer of vinylidene fluoride and hexafluoro propylene is preferable, and polyvinylidene fluoride is more preferable, since such a polymer compound is electrochemically stable.

The composition of the electrolytic solution is similar to the composition of the electrolytic solution of the cylindrical-type secondary battery. The electrolytic solution contains the unsaturated cyclic ester carbonate. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

In the secondary battery, for example, at the time of charge, lithium ions extracted from the cathode 33 are inserted in the anode 34 through the electrolyte layer 36. In contrast, at the time of discharge, lithium ions extracted from the anode 34 are inserted in the cathode 33 through the electrolyte layer 36.

[Method of Manufacturing Secondary Battery]

The secondary battery including the gel electrolyte layer 36 is manufactured, for example, by the following three types of procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on a single surface or both surfaces of the cathode current collector 33A, and the anode 34 is fabricated by forming the anode active material layer 34B on a single surface or both surfaces of the anode current collector 34A. Subsequently, a precursor solution containing an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A by using a welding method and/or the like and the anode lead 32 is attached to the anode current collector 34A by using a welding method and/or the like. Subsequently, the cathode 33 and the anode 34 are layered with the separator 35 in between and are spirally wound to form the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 into the outer package members 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded by using a thermal fusion bonding method and/or the like to obtain a pouched state, and the spirally wound body is contained in the pouch-like outer package member 40. Subsequently, a composition for electrolyte containing an electrolytic solution, a monomer as a raw material for the polymer compound, a polymerization initiator, and other materials such as a polymerization inhibitor as necessary is prepared, which is injected into the pouch-like outer package member 40. Thereafter, the outer package member 40 is hermetically sealed by using a thermal fusion bonding method and/or the like. Subsequently, the monomer is thermally polymerized, and thereby, a polymer compound is formed. Accordingly, the gel electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated include a polymer (a homopolymer, a copolymer, or a multicomponent copolymer) containing vinylidene fluoride as a component. Specific examples thereof include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. In addition to the polymer containing vinylidene fluoride as a component, other one or more polymer compounds may be used. Subsequently, an electrolytic solution is prepared and injected into the outer package member 40. Thereafter, the opening of the outer package member 40 is hermetically sealed by using a thermal fusion bonding method and/or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly, the polymer compound is gelated to form the electrolyte layer 36.

In the third procedure, swollenness of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, sufficient adhesion characteristics are obtained between the cathode 33, the anode 34, and the separator 35, and the electrolyte layer 36.

[Function and Effect of Secondary Battery]

According to the laminated-film-type secondary battery, the anode active material layer 34B contains a carbon material, the thickness of the anode active material layer 34B is equal to or larger than 30 μm, and the electrolytic solution of the electrolyte layer 36 contains the unsaturated cyclic ester carbonate. Therefore, for a reason similar to that of the cylindrical-type secondary battery, superior battery characteristics are obtainable. Other functions and other effects are similar to those of the cylindrical-type secondary battery.

[2. Applications of Secondary Battery]

Next, a description will be given of application examples of the foregoing secondary battery.

Applications of the secondary battery are not particularly limited as long as the secondary battery is used for a machine, a device, an instrument, an apparatus, a system (collective entity of a plurality of devices and the like), or the like that is allowed to use the secondary battery as a driving electric power source, an electric power storage source for electric power storage, or the like. In the case where the secondary battery is used as an electric power source, the secondary battery may be used as a main electric power source (electric power source used preferentially), or an auxiliary electric power source (electric power source used instead of a main electric power source or used being switched from the main electric power source). In the latter case, the main electric power source type is not limited to the secondary battery.

Examples of applications of the secondary battery include electronic apparatuses (including portable electronic apparatuses) such as a video camcoder, a digital still camera, a mobile phone, a notebook personal computer, a cordless phone, a headphone stereo, a portable radio, a portable television, and a personal digital assistant. Further examples thereof include a mobile lifestyle electric appliance such as an electric shaver; a memory device such as a backup electric power source and a memory card; an electric power tool such as an electric drill and an electric saw; a battery pack used as an electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It is needless to say that an application other than the foregoing applications may be adopted.

In particular, the secondary battery is effectively applicable to the battery pack, the electric vehicle, the electric power storage system, the electric power tool, the electronic apparatus, or the like. In these applications, since superior battery characteristics are demanded, the performance is effectively improved by using the secondary battery according to the embodiment of the present application. It is to be noted that the battery pack is an electric power source using a secondary battery, and is what we call an assembled battery or the like. The electric vehicle is a vehicle that works (runs) by using a secondary battery as a driving electric power source. As described above, an automobile (such as a hybrid automobile) including a drive source other than a secondary battery may be included. The electric power storage system is a system using a secondary battery as an electric power storage source. For example, in a home electric power storage system, electric power is stored in the secondary battery as an electric power storage source, and the electric power is consumed as necessary. Thereby, home electric products and the like become usable. The electric power tool is a tool in which a movable section (such as a drill) is moved by using a secondary battery as a driving electric power source. The electronic apparatus is an apparatus executing various functions by using a secondary battery as a driving electric power source (electric power supply source).

A description will be specifically given of some application examples of the secondary battery. The configurations of the respective application examples explained below are merely examples, and may be changed as appropriate.

[2-1. Battery Pack]

Figure 5:
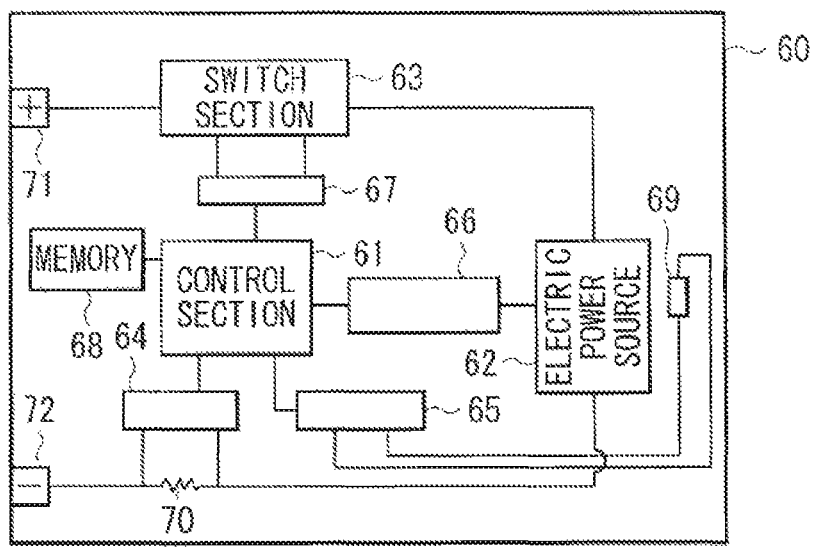
FIG. 5 is a block diagram illustrating a configuration of an application example (battery pack) of the secondary battery.

FIG. 5 illustrates a block configuration of a battery pack. For example, as illustrated in FIG. 5, the battery pack includes a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of a plastic material and/or the like.

The control section 61 controls operation of the whole battery pack (including a used state of the electric power source 62), and includes, for example, a central processing unit (CPU) and/or the like. The electric power source 62 includes one or more secondary batteries (not illustrated). The electric power source 62 is, for example, an assembled battery including two or more secondary batteries. Connection type thereof may be a series-connected type, may be a parallel-connected type, or a mixed type thereof. As an example, the electric power source 62 includes six secondary batteries connected in a manner of dual-parallel and three-series.

The switch section 63 switches the used state of the electric power source 62 (whether or not the electric power source 62 is connectable to an external device) according to an instruction of the control section 61. The switch section 63 includes, for example, a charge control switch, a discharge control switch, a charging diode, a discharging diode, and the like (not illustrated). The charge control switch and the discharge control switch are each, for example, a semiconductor switch such as a field-effect transistor (MOSFET) using a metal oxide semiconductor.

The current measurement section 64 measures a current by using the current detection resistance 70, and outputs the measurement result to the control section 61. The temperature detection section 65 measures temperature by using the temperature detection device 69, and outputs the measurement result to the control section 61. The temperature measurement result is used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion (A/D conversion) on the measured voltage, and supplies the resultant to the control section 61.

The switch control section 67 controls operations of the switch section 63 according to signals inputted from the current measurement section 64 and the voltage detection section 66.

The switch control section 67 executes control so that a charge current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charge current.

Further, the switch control section 67 executes control so that a discharge current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. For example, in the case where a large current flows at the time of discharge, the switch control section 67 blocks the discharge current.

It is to be noted that, in the secondary battery, for example, the overcharge detection voltage is 4.2 V±0.05 V, and the over-discharge detection voltage is 2.4 V±0.1 V.

The memory 68 is, for example, an EEPROM as a nonvolatile memory or the like. The memory 68 stores, for example, numerical values calculated by the control section 61 and information of the secondary battery measured in a manufacturing step (such as an internal resistance in the initial state). It is to be noted that, in the case where the memory 68 stores a full charge capacity of the secondary battery, the control section 61 is allowed to comprehend information such as a remaining capacity.

The temperature detection device 69 measures temperature of the electric power source 62, and outputs the measurement result to the control section 61. The temperature detection device 69 is, for example, a thermistor or the like.

The cathode terminal 71 and the anode terminal 72 are terminals connected to an external device (such as a notebook personal computer) driven by using the battery pack or an external device (such as a battery charger) used for charging the battery pack. The electric power source 62 is charged and discharged through the cathode terminal 71 and the anode terminal 72.

[2-2. Electric Vehicle]

Figure 6:
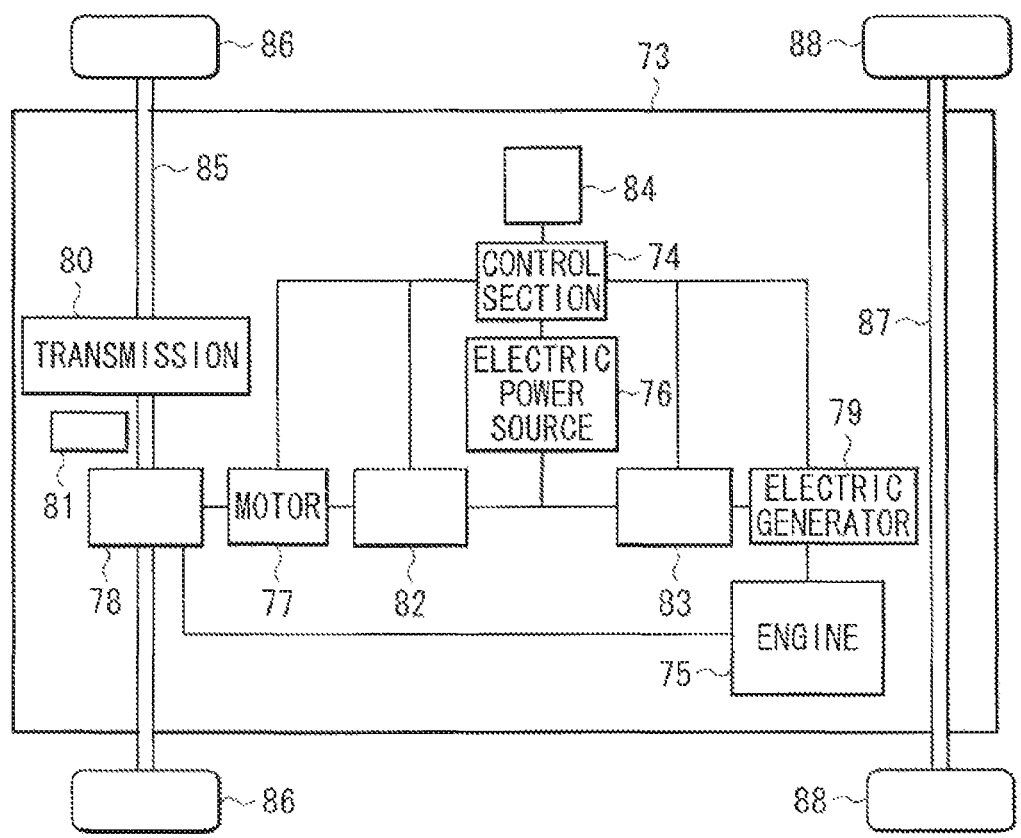
FIG. 6 is a block diagram illustrating a configuration of an application example (electric vehicle) of the secondary battery.

FIG. 6 illustrates a block configuration of a hybrid automobile as an example of electric vehicles. For example, as illustrated in FIG. 6, the electric vehicle includes a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle includes, for example, a front drive shaft 85 and a front tire 86 that are connected to the differential 78 and the transmission 80, a rear drive shaft 87, and a rear tire 88.

The electric vehicle is runnable by using one of the engine 75 and the motor 77 as a drive source. The engine 75 is a main power source, and is, for example, a petrol engine. In the case where the engine 75 is used as a power source, drive power (torque) of the engine 75 is transferred to the front tire 86 or the rear tire 88 through the differential 78, the transmission 80, and the clutch 81 as drive sections, for example. The torque of the engine 75 is also transferred to the electric generator 79. Due to the torque, the electric generator 79 generates alternating-current electric power. The alternating-current electric power is converted into direct-current electric power through the inverter 83, and the converted power is stored in the electric power source 76. On the other hand, in the case where the motor 77 as a conversion section is used as a power source, electric power (direct-current electric power) supplied from the electric power source 76 is converted into alternating-current electric power through the inverter 82. The motor 77 is driven by the alternating-current electric power. Drive power (torque)

obtained by converting the electric power by the motor 77 is transferred to the front tire 86 or the rear tire 88 through the differential 78, the transmission 80, and the clutch 81 as the drive sections, for example.

It is to be noted that, alternatively, the following mechanism may be adopted. In the mechanism, in the case where speed of the electric vehicle is reduced by an unillustrated brake mechanism, the resistance at the time of speed reduction is transferred to the motor 77 as torque, and the motor 77 generates alternating-current electric power by the torque. It is preferable that the alternating-current electric power be converted to direct-current electric power through the inverter 82, and the direct-current regenerative electric power be stored in the electric power source 76.

The control section 74 controls operations of the whole electric vehicle, and, for example, includes a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 are used, for example, for controlling the number of revolutions of the engine 75 or for controlling opening level (throttle opening level) of an unillustrated throttle valve. The various sensors 84 include, for example, a speed sensor, an acceleration sensor, an engine frequency sensor, and/or the like.

The description has been hereinbefore given of the hybrid automobile as an electric vehicle. However, examples of the electric vehicles may include a vehicle (electric automobile) working by using only the electric power source 76 and the motor 77 without using the engine 75.

[2-3. Electric Power Storage System]

Figure 7:
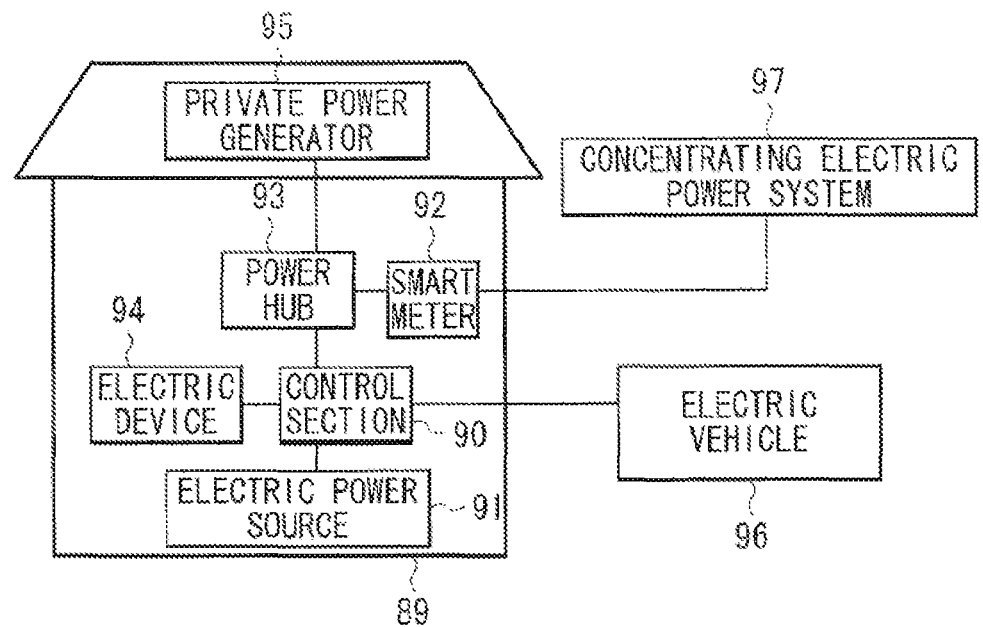
FIG. 7 is a block diagram illustrating a configuration of an application example (electric power storage system) of the secondary battery.

FIG. 7 illustrates a block configuration of an electric power storage system. For example, as illustrated in FIG. 7, the electric power storage system includes a control section 90, an electric power source 91, a smart meter 92, and a power hub 93 inside a house 89 such as a general residence and a commercial building.

In this case, the electric power source 91 is connected to, for example, an electric device 94 arranged inside the house 89, and is connectable to an electric vehicle 96 parked outside the house 89. Further, for example, the electric power source 91 is connected to a private power generator 95 arranged inside the house 89 through the power hub 93, and is connectable to an external concentrating electric power system 97 thorough the smart meter 92 and the power hub 93.

It is to be noted that the electric device 94 includes, for example, one or more home electric appliances such as a refrigerator, an air conditioner, a television, and a water heater. The private power generator 95 is, for example, one or more of a solar power generator, a wind-power generator, and the like. The electric vehicle 96 is, for example, one or more of an electric automobile, an electric motorcycle, a hybrid automobile, and the like. The concentrating electric power system 97 is, for example, one or more of a thermal power plant, an atomic power plant, a hydraulic power plant, a wind-power plant, and the like.

The control section 90 controls operations of the whole electric power storage system (including a used state of the electric power source 91), and, for example, includes a CPU and/or the like. The electric power source 91 includes one or more secondary batteries (not illustrated). The smart meter 92 is, for example, an electric power meter compatible with a network arranged in the house 89 demanding electric power, and is communicable with an electric power supplier. Accordingly, for example, while the smart meter 92 communicates with outside as necessary, the smart meter 92 controls the balance between supply and demand in the house 89 and allows effective and stable energy supply.

In the electric power storage system, for example, electric power is stored in the electric power source 91 from the concentrating electric power system 97 as an external electric power source through the smart meter 92 and the power hub 93, and electric power is stored in the electric power source 91 from the private power generator 95 as an independent electric power source through the power hub 93. As necessary, the electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 by using the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

The foregoing electric power storage system may be arranged for each household (family unit), or may be arranged for a plurality of households (family units).

[2-4. Electric Power Tool]

Figure 8:
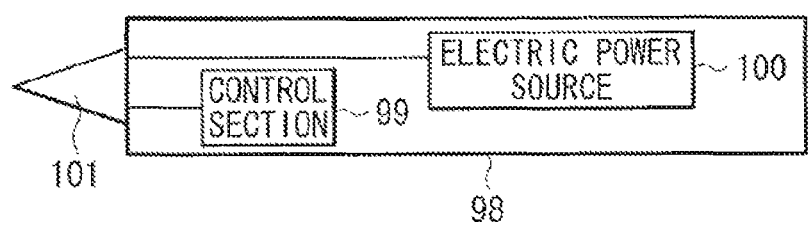
FIG. 8 is a block diagram illustrating a configuration of an application example (electric power tool) of the secondary battery.

FIG. 8 illustrates a block configuration of an electric power tool. For example, as illustrated in FIG. 8, the electric power tool is an electric drill, and includes a control section 99 and an electric power source 100 in a tool body 98 made of a plastic material and/or the like. For example, a drill section 101 as a movable section is attached to the tool body 98 in an operable (rotatable) manner.

The control section 99 controls operations of the whole electric power tool (including a used state of the electric power source 100), and includes, for example, a CPU and/or the like. The electric power source 100 includes one or more secondary batteries (not illustrated). The control section 99 executes control so that electric power is supplied from the electric power source 100 to the drill section 101 as necessary according to operation of an unillustrated operation switch to operate the drill section 101.

EXAMPLES

Specific Examples according to the embodiment of the present application will be described in detail.

Examples 1-1 to 1-22

The cylindrical-type lithium ion secondary battery illustrated in FIG. 1 and FIG. 2 was fabricated by the following procedure.

In fabricating the cathode 21, first, lithium carbonate ($Li_2CO_3$) and cobalt carbonate ($CoCO_3$) were mixed at a molar ratio of $Li_2CO_3:CoCO_3=0.5:1$. Subsequently, the mixture was fired in the air (900 deg C. for 5 hours). Thereby, lithium-cobalt composite oxide ($LiCoO_2$) was obtained. Subsequently, 94 parts by mass of a cathode active material ($LiCoO_2$), 3 parts by mass of a cathode binder (polyvinylidene fluoride: PVDF), and 3 parts by mass of a cathode electric conductor (graphite) were mixed to obtain a cathode mixture. Subsequently, the cathode mixture was dispersed in an organic solvent (N-methyl-2-pyrrolidone: NMP) to obtain a paste cathode mixture slurry. Subsequently, both surfaces of the cathode current collector 21A in the shape of a strip (aluminum foil being 10 µm thick) were coated with the cathode mixture slurry uniformly by using a coating device, which was dried to form the cathode active material layer 21B. Finally, the cathode active material layer 21B was compression-molded by using a roll pressing machine.

In fabricating the anode 22, 90 parts by mass of an anode active material (artificial graphite) and 10 parts by mass of an anode binder (PVDF) were mixed to obtain an anode mixture. Subsequently, the anode mixture was dispersed in an organic solvent (NMP) to obtain a paste anode mixture slurry. Subsequently, both surfaces of the anode current collector 22A in the shape of a strip (electrolytic copper foil being 10 µm thick) were coated with the anode mixture slurry uniformly by using a coating device, which was dried to form the anode active material layer 22B. Finally, the anode active material layer 22B was compression-molded by using a roll pressing machine. In forming the anode active material layer 22B, as illustrated in table 1, the thickness (µm) of the anode active material layer 22B on a single surface side of the anode current collector 22A and the volume density thereof (g/cm$^3$) were adjusted according to the coating amount of the anode mixture slurry and the press pressure.

In preparing an electrolytic solution, an electrolyte salt (LiPF$_6$) was dissolved in a solvent (ethylene carbonate (EC) and dimethyl carbonate (DMC)). Thereafter, as illustrated in Table 1, as necessary, an unsaturated cyclic ester carbonate was added thereto. In this case, the composition of the solvent was EC:DMC=50:50 at a weight ratio, and the content of the electrolyte salt with respect to the solvent was 1 mol/kg.

In assembling the secondary battery, first, the cathode lead 25 made of aluminum was welded to the cathode current collector 21A, and the anode lead 26 made of nickel was welded to the anode current collector 22A. Subsequently, the cathode 21 and the anode 22 were layered with the separator 23 (microporous polypropylene film being 25 µm thick) in between and were spirally wound. Thereafter, the winding end section was fixed by using an adhesive tape to fabricate the spirally wound electrode body 20. Subsequently, the center pin 24 was inserted in the center of the spirally wound electrode body 20. Subsequently, while the spirally wound electrode body 20 was sandwiched between the pair of insulating plates 12 and 13, the spirally wound electrode body 20 was contained in the battery can 11 made of iron and plated with nickel. In this case, one end of the cathode lead 25 was welded to the safety valve mechanism 15, and one end of the anode lead 26 was welded to the battery can 11. Subsequently, the electrolytic solution was injected into the battery can 11 by a depressurization method, and the separator 23 was impregnated with the electrolytic solution. Finally, at the open end of the battery can 11, the battery cover 14, the safety valve mechanism 15, and the PTC device 16 were fixed by being swaged with the gasket 17. The cylindrical-type secondary battery was thereby completed. In fabricating the secondary battery, lithium metal was prevented from being precipitated on the anode 22 at the time of full charge by adjusting the thickness of the cathode active material layer 21B.

Battery characteristics (cycle characteristics and conservation characteristics) of the secondary battery were examined. Results illustrated in Table 1 were obtained.

In examining the cycle characteristics, one cycle of charge and discharge was performed on the secondary battery in the ambient temperature environment (23 deg C.) to stabilize the battery state. Thereafter, another one cycle of charge and discharge was performed on the secondary battery in the same environment, and a discharge capacity was measured. Subsequently, the secondary battery was repeatedly charged and discharged until the total number of cycles reached 300 in the same environment, and a discharge capacity was measured. From these results, cycle retention ratio (%)= (discharge capacity at the 300th cycle/discharge capacity at the second cycle)×100 was calculated. At the time of charge, charge was performed at a current of 1 C until the voltage reached the upper limit voltage of 4.2 V, and further charge was performed at a constant voltage until the total time from starting charge reached 3 hours. At the time of discharge, discharge was performed at a current of 1 C until the voltage reached the final voltage of 3 V. "1 C" is a current value at which the battery capacity (theoretical capacity) is fully discharged in 1 hour.

In examining the conservation characteristics, a secondary battery with its battery state stabilized by a procedure similar to that in the case of examining the cycle characteristics was used. One cycle of charge and discharge was performed on the secondary battery in the ambient temperature environment (23 deg C.), and a discharge capacity was measured. Subsequently, the secondary battery in a state of being charged again was stored in a constant temperature bath (80 deg C.) for 10 days. Thereafter, the secondary battery was discharged in the ambient temperature environment (23 deg C.), and a discharge capacity was measured. From these results, conservation retention ratio (%)=(discharge capacity after storage/discharge capacity before storage)×100 was calculated. The charge and discharge conditions are similar to those in the case of examining the cycle characteristics.

It is to be noted that parenthetic numerical values described in the columns of cycle retention ratio and conservation retention ratio in Table 1 and the other tables following Table 1 represent variable values resulting from presence or absence of the unsaturated cyclic ester carbonate in the electrolytic solution. Each of the variable values is calculated based on, variable value (%)=(value in the case where the unsaturated cyclic ester carbonate is contained in the electrolytic solution-value in the case where the unsaturated cyclic ester carbonate is not contained in the electrolytic solution).

TABLE 1

Anode active material: artificial graphite; Rating capacity: 2600 m Ah

| Example | Anode Thickness (μm) | Volume density (g/cm³) | Electrolyte salt | Solvent | Unsaturated cyclic ester carbonate Type | Content (wt %) | Cycle retention ratio (%) | Conservation retention ratio (%) |
|---|---|---|---|---|---|---|---|---|
| 1-1 | 50 | 1.85 | LiPF$_6$ | EC + DMC | Formula (1-1) | 0.01 | 70 (+5) | 82 (+1) |
| 1-2 | | | | | | 0.1 | 72 (+7) | 83 (+2) |
| 1-3 | | | | | | 0.5 | 75 (+10) | 85 (+4) |
| 1-4 | | | | | | 1 | 80 (+15) | 86 (+5) |
| 1-5 | | | | | | 2 | 82 (+17) | 87 (+6) |
| 1-6 | | | | | | 5 | 80 (+15) | 90 (+9) |
| 1-7 | | | | | | 10 | 70 (+5) | 88 (+7) |
| 1-8 | 30 | 1.85 | LiPF$_6$ | EC + DMC | Formula (1-1) | 2 | 93 (+8) | 90 (+5) |
| 1-9 | 40 | | | | | | 88 (+14) | 88 (+5) |
| 1-10 | 60 | | | | | | 72 (+28) | 87 (+7) |
| 1-11 | 100 | | | | | | 50 (+40) | 85 (+9) |
| 1-12 | 50 | 1.85 | LiPF$_6$ | EC + DMC | Formula (1-4) | 2 | 78 (+13) | 83 (+2) |
| 1-13 | | | | | Formula (1-16) | 2 | 80 (+15) | 85 (+4) |
| 1-14 | | | | | Formula (1-18) | 2 | 77 (+12) | 83 (+2) |
| 1-15 | | | | | Formula (1-32) | 2 | 78 (+13) | 84 (+3) |
| 1-16 | 20 | 1.85 | LiPF$_6$ | EC + DMC | — | — | 90 | 90 |
| 1-17 | | | | | Formula (1-1) | 2 | 90 (+0) | 90 (+0) |
| 1-18 | 30 | | | | — | — | 85 | 85 |
| 1-19 | 40 | | | | | | 74 | 83 |
| 1-20 | 50 | | | | | | 65 | 81 |
| 1-21 | 60 | | | | | | 44 | 80 |
| 1-22 | 100 | | | | | | 10 | 76 |

In the case where the anode active material layer 22B contained the carbon material (artificial graphite), the battery characteristics showed a specific tendency according to a relation between the thickness of the anode active material layer 22B and presence or absence of the unsaturated cyclic ester carbonate in the electrolytic solution.

More specifically, in the case where the thickness of the anode active material layer 22B was less than 30 μm, even if the electrolytic solution contained the unsaturated cyclic ester carbonate, the cycle retention ratio and the conservation retention ratio were not changed. One reason for this result may be as follows. In the case where the thickness of the anode active material layer 22B is small, a decomposition reaction of the electrolytic solution resulting from factors such as reactivity of the carbon material is less likely to proceed inherently. Therefore, in this case, the function of suppressing decomposition of the electrolytic solution by the unsaturated cyclic ester carbonate is not substantially exercised.

On the other hand, in the case where the thickness of the anode active material layer 22B was equal to or larger than 30 μm, and more specifically, was from 30 μm to 100 μm both inclusive, when the electrolytic solution contained the unsaturated cyclic ester carbonate, the cycle retention ratio was increased. One reason for this result may be as follows. In the case where the thickness of the anode active material layer 22B is large, a decomposition reaction of the electrolytic solution resulting from factors such as reactivity of the carbon material easily proceeds inherently. Therefore, in this case, the function of suppressing decomposition of the electrolytic solution by the unsaturated cyclic ester carbonate is effectively exercised.

In particular, in the case where the thickness of the anode active material layer 22B was equal to or larger than 30 μm, and the electrolytic solution contained the unsaturated cyclic ester carbonate, if the content of the unsaturated cyclic ester carbonate was from 0.01 wt % to 10 wt % both inclusive, a high cycle retention ratio and a high conservation retention ratio were obtained.

Further, in the case where the content of the unsaturated cyclic ester carbonate was from 0.5 wt % to 10 wt % both inclusive, the cycle retention ratio and the conservation retention ratio were further increased.

Examples 2-1 to 2-9

Secondary batteries were fabricated by a procedure similar to that of Example 1-5, except that the composition of the solvent was changed as illustrated in Table 2, and the respective characteristics were examined.

In this case, newly used solvents are as follows. As other unsaturated cyclic ester carbonate, vinylene carbonate (VC) was used. As halogenated ester carbonates, 4-fluoro-1,3-dioxolane-2-one (FEC), trans-4,5-difluoro-1,3-dioxolane-2-one (t-DFEC), and bis(fluoromethyl)carbonate (DFDMC) were used. As sultone, propene sultone (PRS) was used. As acid anhydrides, succinic anhydride (SCAH) and sulfopropionic anhydride (PSAH) were used.

The content of VC in the solvent was 2 wt %, the content of FEC, t-DFEC, or DFDMC in the solvent was 5 wt %, and the content of PRS, SCAH, or PSAH in the solvent was 1 wt %.

TABLE 2

Anode active material: artificial graphite; Rating capacity: 2600 m Ah

| | Anode | | Electrolytic solution | | Unsaturated cyclic ester carbonate | | Cycle retention | Conservation retention |
| Example | Thickness (μm) | Volume density (g/cm³) | Electrolyte salt | Solvent | Type | Content (wt %) | ratio (%) | ratio (%) |
|---|---|---|---|---|---|---|---|---|
| 2-1 | 50 | 1.85 | LiPF$_6$ | EC + DMC | VC | Formula (1-1) | 2 | 90 (+25) | 90 (+9) |
| 2-2 | | | | | FEC | | | 92 (+27) | 89 (+8) |
| 2-3 | | | | | t-DFEC | | | 88 (+23) | 88 (+7) |
| 2-4 | | | | | DFDMC | | | 90 (+25) | 88 (+7) |
| 2-5 | | | | | PRS | | | 85 (+20) | 92 (+11) |
| 2-6 | | | | | SCAH | | | 90 (+25) | 90 (+9) |
| 2-7 | | | | | PSAH | | | 90 (+25) | 95 (+14) |
| 2-8 | 50 | 1.85 | LiPF$_6$ | EC + DMC | VC | — | — | 70 | 83 |
| 2-9 | | | | | FEC | | | 80 | 82 |

Even if the composition of the solvent was changed, high cycle retention ratios and high conservation retention ratios were obtained. In particular, in the case where the electrolytic solution contained other unsaturated cyclic ester carbonate, the halogenated ester carbonate, the sultone, or the acid anhydride, the cycle retention ratio and the conservation retention ratio were further increased.

Examples 3-1 to 3-3

Secondary batteries were fabricated by a procedure similar to that of Example 1-5 except that the composition of the electrolyte salt was changed as illustrated in Table 3, and the respective characteristics were examined.

In this case, newly used electrolyte salts were lithium tetrafluoroborate (LiBF$_4$), bis[oxalato-O,O'] lithium borate (LiBOB) represented by Formula (8-6), and bis(trifluoromethanesulfonyl)imide lithium (LiN(CF$_3$SO$_2$)$_2$: LiTFSI). The content of LiPF$_6$ with respect to the solvent was 0.9 mol/kg, and the content of LiBF$_4$ etc. with respect to the solvent was 0.1 mol/kg.

TABLE 3

Anode active material: artificial graphite; Rating capacity: 2600 m Ah

| | Anode | | Electrolytic solution | | Unsaturated cyclic ester carbonate | | Cycle retention | Conservation retention |
| Example | Thickness (μm) | Volume density (g/cm³) | Electrolyte salt | Solvent | Type | Content (wt %) | ratio (%) | ratio (%) |
|---|---|---|---|---|---|---|---|---|
| 3-1 | 50 | 1.85 | LiPF$_6$ LiBF$_4$ | EC + DMC | Formula (1-1) | 2 | 83 (+18) | 90 (+9) |
| 3-2 | | | LiBOB | | | | 84 (+19) | 90 (+9) |
| 3-3 | | | LiTFSI | | | | 83 (+18) | 90 (+9) |

Even if the composition of the electrolyte salt was changed, high cycle retention ratios and high conservation retention ratios were obtained. In particular, in the case where the electrolytic solution contained other electrolyte salt such as LiBF$_4$, the cycle retention ratio and the conservation retention ratio were further increased.

Examples 4-1 to 4-6

Secondary batteries were fabricated by a procedure similar to those of Examples 1-5 and 1-20 except that the volume density of the anode active material layer 22B was changed as illustrated in Table 4, and the respective characteristics were examined.

TABLE 4

| | Anode | | Electrolytic solution | | | | | Cycle | Conservation |
|---|---|---|---|---|---|---|---|---|---|
| | | | | | Unsaturated cyclic ester carbonate | | Rating | retention | retention |
| Example | Thickness (μm) | Volume density (g/cm³) | Electrolyte salt | Solvent | Type | Content (wt %) | capacity (mAh) | ratio (%) | ratio (%) |
| 4-1 | 50 | 1.4 | LiPF₆ | EC + DMC | Formula (1-1) | 2 | 2300 | 94(+6) | 79 (+4) |
| 4-2 | | 1.6 | | | | | 2450 | 90 (+10) | 87 (+5) |
| 4-3 | | 1.95 | | | | | 2650 | 56 (+14) | 82 (+4) |
| 4-4 | 50 | 1.4 | LiPF₆ | EC + DMC | — | — | 2300 | 88 | 75 |
| 4-5 | | 1.6 | | | | | 2450 | 80 | 82 |
| 4-6 | | 1.95 | | | | | 2650 | 42 | 78 |

Anode active material: artificial graphite

Even if the volume density was changed, results similar to those in Table 1 were obtained. In particular, in the case where the volume density was from 1.4 g/cm³ to 1.95 g/cm³ both inclusive, a high cycle retention ratio and a high conservation retention ratio were obtained.

From the results of Table 1 to Table 4, in the case where the anode active material layer contained a carbon material, the thickness of the anode active material layer was from 30 μm to 100 μm both inclusive, and the electrolytic solution contained the unsaturated cyclic ester carbonate, superior battery characteristics were obtained.

The present application has been described with reference to the embodiment and Examples. However, the present application is not limited to the examples described in the embodiment and Examples, and various modifications may be made. For example, the description has been given of the lithium ion secondary battery as a secondary battery type. However, applicable secondary battery type is not limited thereto. The secondary battery of the present application is similarly applicable to a secondary battery in which the anode capacity includes a capacity due to inserting and extracting lithium ions and a capacity associated with precipitation and dissolution of lithium metal, and the battery capacity is expressed by the sum of these capacities. In this case, an anode material capable of inserting and extracting lithium ions is used as an anode active material, and the chargeable capacity of the anode material is set to a smaller value than the discharge capacity of the cathode.

Further, the description has been given with the specific examples of the case in which the battery structure is the cylindrical type or the laminated film type, and the battery device has the spirally wound structure. However, applicable structures are not limited thereto. The secondary battery of the present application is similarly applicable to a battery having other battery structure such as a square-type battery, a coin-type battery, and a button-type battery or a battery in which the battery device has other structure such as a laminated structure.

Further, the description has been given of the case using Li as an electrode reactant. However, the electrode reactant is not necessarily limited thereto. As an electrode reactant, for example, other Group 1 element such as Na and K, a Group 2 element such as Mg and Ca, or other light metal such as Al may be used. The effect of the present application may be obtained without depending on the electrode reactant type, and therefore, even if the electrode reactant type is changed, a similar effect is obtainable.

Further, with regard to the content of the unsaturated cyclic ester carbonate, the description has been given of the appropriate range derived from the results of Examples. However, the description does not totally deny a possibility that the content is out of the foregoing range. That is, the foregoing appropriate range is a range particularly preferable for obtaining the effects of the present application. Therefore, as long as the effects of the present application are obtained, the content may be out of the foregoing range in some degrees.

It is possible to achieve at least the following configurations from the above-described exemplary embodiment and the modifications of the disclosure.

(1) A secondary battery including:
a cathode;
an anode; and
an electrolytic solution, wherein
the anode includes an anode active material layer on an anode current collector,
the anode active material layer includes a carbon material,
the anode active material layer has a thickness from about 30 micrometers to about 100 micrometers both inclusive, and the electrolytic solution includes an unsaturated cyclic ester carbonate represented by the following Formula (1),

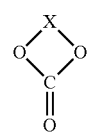

(1)

where X is a divalent group in which m-number of >C=CR1R2 and n-number of >CR3R4 are bonded in any order; each of R1 to R4 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 are allowed to be bonded to one another; and m and n satisfy m≥1 and n≥0.

(2) The secondary battery according to (1), wherein
the halogen group includes a fluorine group, a chlorine group, a bromine group, and an iodine group, and
the monovalent hydrocarbon group, the monovalent halogenated hydrocarbon group, the monovalent oxygen-containing hydrocarbon group, and the monovalent halogenated oxygen-containing hydrocarbon group include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, a cycloalkyl group with carbon number from 3 to 18 both inclusive, an alkoxy group with carbon number from 1 to 12 both inclusive, a group obtained by bonding two or more thereof, and a group obtained by substituting each of part or all of hydrogen groups thereof by a halogen group.

(3) The secondary battery according to (1) or (2), wherein the unsaturated cyclic ester carbonate is represented by one of the following Formula (2) and the following Formula (3),

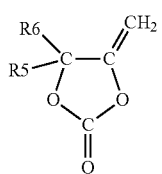  (2)

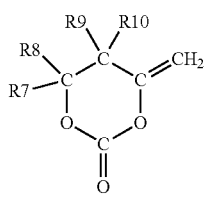  (3)

where each of R5 to R10 is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; the R5 and the R6 are allowed to be bonded to each other; and any two or more of the R7 to the R10 are allowed to be bonded to one another.

(4) The secondary battery according to any one of (1) to (3), wherein the unsaturated cyclic ester carbonate is represented by one of the following Formula (1-1) to the following Formula (1-56),

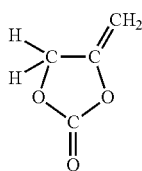  (1-1)

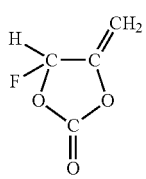  (1-2)

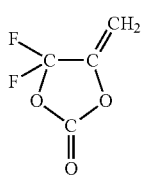  (1-3)

-continued

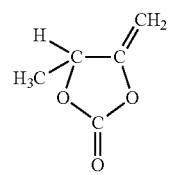  (1-4)

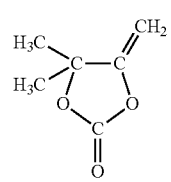  (1-5)

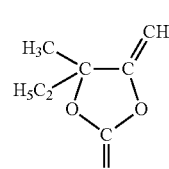  (1-6)

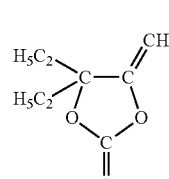  (1-7)

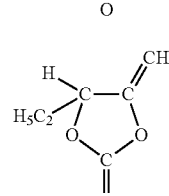  (1-8)

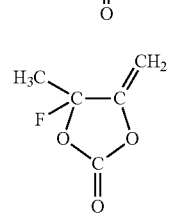  (1-9)

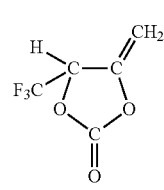  (1-10)

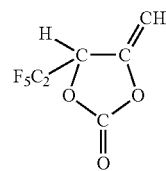  (1-11)

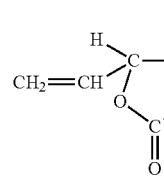  (1-12)

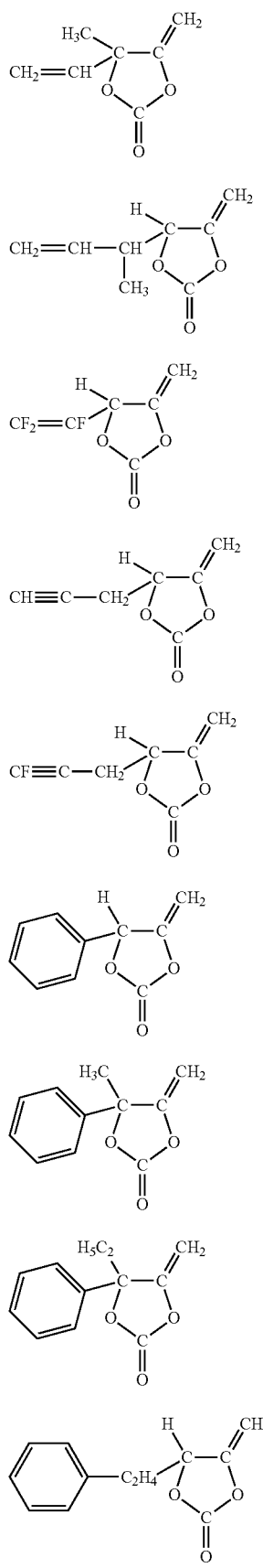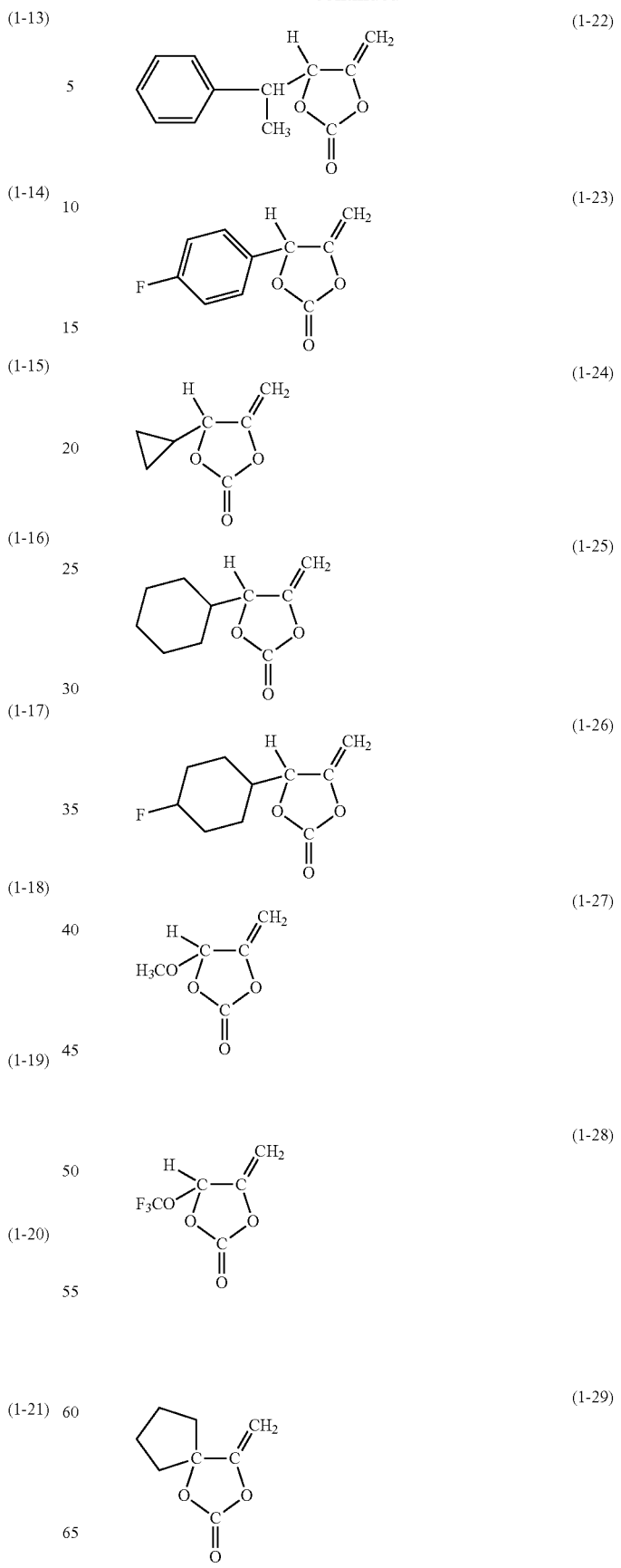

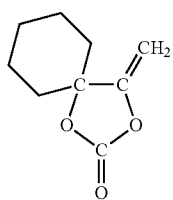 (1-30)
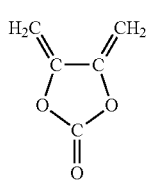 (1-31)
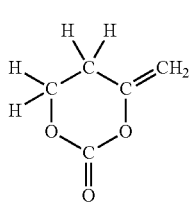 (1-32)
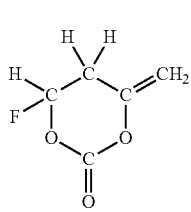 (1-33)
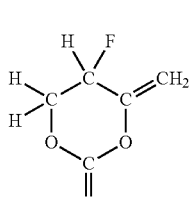 (1-34)
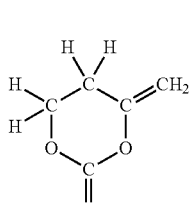 (1-35)
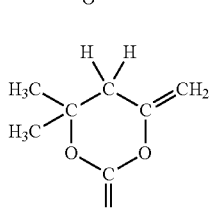 (1-36)
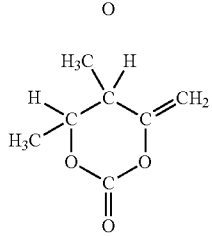 (1-37)
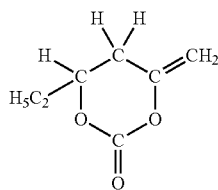 (1-38)
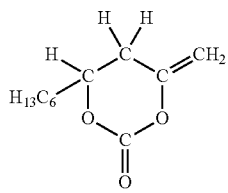 (1-39)
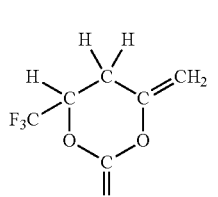 (1-40)
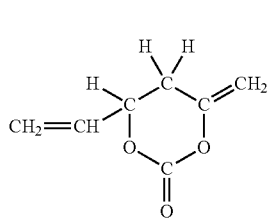 (1-41)
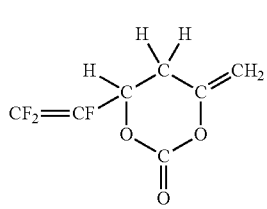 (1-42)
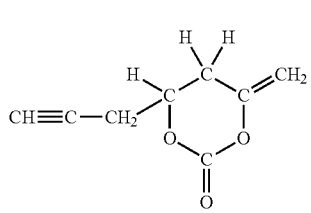 (1-43)
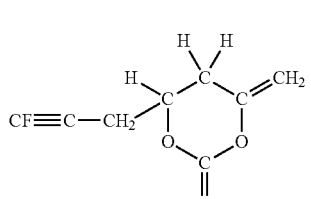 (1-44)
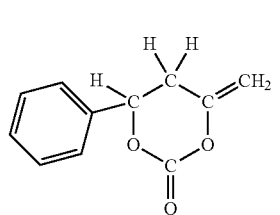 (1-45)

(1-46) 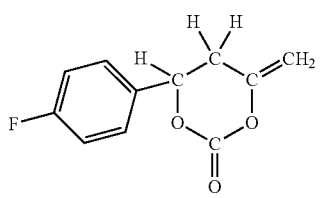

(1-47) 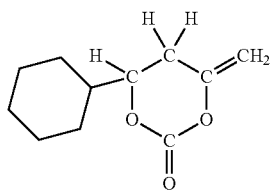

(1-48) 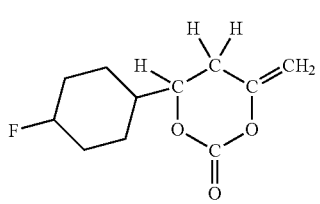

(1-49) 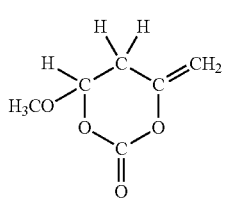

(1-50) 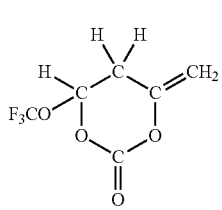

(1-51) 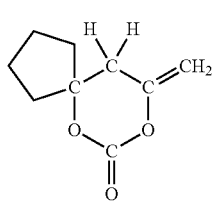

(1-52) 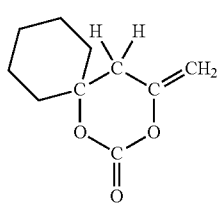

(1-53) 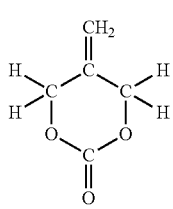

(1-54) 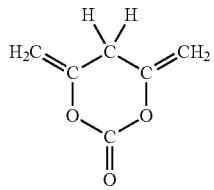

(1-55) 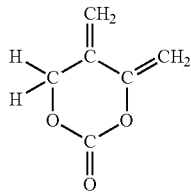

(1-56) 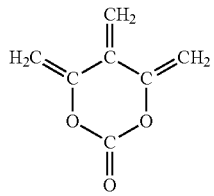

(5) The secondary battery according to any one of (1) to (4), wherein a content of the unsaturated cyclic ester carbonate in the electrolytic solution is from about 0.01 weight percent to about 10 weight percent both inclusive.

(6) The secondary battery according to any one of (1) to (5), wherein volume density of the anode active material layer is from about 1.4 grams per cubic centimeter to about 1.95 grams per cubic centimeter both inclusive.

(7) The secondary battery according to any one of (1) to (6), wherein the secondary battery is a lithium ion secondary battery.

(8) A battery pack including:
the secondary battery according to any one of (1) to (7);
a control section controlling a used state of the secondary battery; and
a switch section switching the used state of the secondary battery according to an instruction of the control section.

(9) An electric vehicle including:
the secondary battery according to any one of (1) to (7);
a conversion section converting electric power supplied from the secondary battery into drive power;
a drive section operating according to the drive power; and
a control section controlling a used state of the secondary battery.

(10) An electric power storage system including:
the secondary battery according to any one of (1) to (7);
one or more electric devices supplied with electric power from the secondary battery; and
a control section controlling the supplying of the electric power from the secondary battery to the one or more electric devices.

(11) An electric power tool including:
the secondary battery according to any one of (1) to (7); and
a movable section being supplied with electric power from the secondary battery.

(12) An electronic apparatus including the secondary battery according to any one of (1) to (7) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a cathode;
an anode; and
an electrolytic solution,
wherein the anode comprises an anode active material layer,
wherein the anode active material layer comprises a carbon material,
wherein the anode active material layer has a thickness from about 30 micrometers to about 100 micrometers,
wherein the electrolytic solution comprises an unsaturated cyclic ester carbonate represented by Formula (1-16):

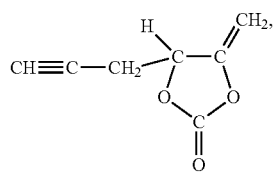

(1-16)

wherein a volume density of the anode active material layer ranges from greater than or equal to 1.4 grams per cubic centimeter to less than 1.6 grams per cubic centimeter, and
wherein a content of the unsaturated cyclic ester carbonate in the electrolytic solution is from about 0.01 wt % to about 5 wt %.

2. An electronic apparatus comprising an electric power supply source including the secondary battery according to claim 1.

3. An electric power tool comprising:
a secondary battery according to claim 1; and
a movable section being supplied with electric power from the secondary battery.

4. A battery pack comprising:
a secondary battery according to claim 1;
a control section controlling a used state of the secondary battery; and
a switch section switching the used state of the secondary battery according to an instruction of the control section.

5. An electric power storage system comprising:
a secondary battery according to claim 1;
one or more electric devices supplied with electric power from the secondary battery; and
a control section controlling the supplying of the electric power from the secondary battery to the one or more electric devices.

6. An electric vehicle comprising:
a secondary battery according to claim 1;
a conversion section converting electric power supplied from the secondary battery into drive power;
a drive section operating according to the drive power; and
a control section controlling a used state of the secondary battery.

7. A secondary battery comprising:
a cathode;
an anode; and
an electrolytic solution,
wherein the anode comprises an anode active material layer,
wherein the anode active material layer comprises a carbon material,
wherein the anode active material layer has a thickness from about 30 micrometers to about 100 micrometers,
wherein the electrolytic solution comprises an unsaturated cyclic ester carbonate represented by Formula (1-18):

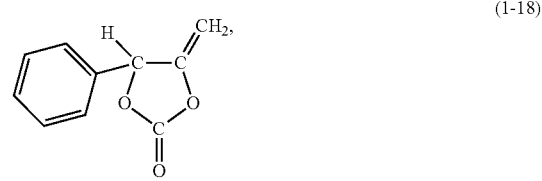 [SMILES: C=C1OC(=O)OC1c1ccccc1]

(1-18)

wherein a volume density of the anode active material layer ranges from greater than or equal to 1.4 grams per cubic centimeter to less than 1.6 grams per cubic centimeter, and
wherein a content of the unsaturated cyclic ester carbonate in the electrolytic solution is from about 0.01 wt % to about 5 wt %.

8. An electronic apparatus comprising an electric power supply source including the secondary battery according to claim 7.

9. An electric power tool comprising:
a secondary battery according to claim 7; and
a movable section being supplied with electric power from the secondary battery.

10. A battery pack comprising:
a secondary battery according to claim 7;
a control section controlling a used state of the secondary battery; and
a switch section switching the used state of the secondary battery according to an instruction of the control section.

11. An electric power storage system comprising:
a secondary battery according to claim 7;
one or more electric devices supplied with electric power from the secondary battery; and
a control section controlling the supplying of the electric power from the secondary battery to the one or more electric devices.

12. An electric vehicle comprising:
a secondary battery according to claim 7;
a conversion section converting electric power supplied from the secondary battery into drive power;
a drive section operating according to the drive power; and
a control section controlling a used state of the secondary battery.

* * * * *